United States Patent [19]

Sanford et al.

[11] Patent Number: 4,899,157

[45] Date of Patent: Feb. 6, 1990

[54] LEADING EDGE DETECTOR/REPLY QUANTIZER

[75] Inventors: Norman R. Sanford, Cockeysville; Bernard J. Lyons; Robert C. Yienger, both of Baltimore, all of Md.

[73] Assignee: Allied-Signal Inc., Morris Township, Morris County, N.J.

[21] Appl. No.: 332,135

[22] Filed: Apr. 3, 1989

[51] Int. Cl.⁴ .............................................. G019 13/74
[52] U.S. Cl. ...................................................... 342/40
[58] Field of Search ....................... 342/40, 45, 32, 37, 342/46, 51; 307/360, 247.1

[56] References Cited

U.S. PATENT DOCUMENTS

| | | | |
|---|---|---|---|
| 3,705,402 | 12/1972 | Ballantyne et al. | 342/40 |
| 3,732,563 | 5/1973 | Nelson | 342/40 |
| 4,052,721 | 10/1977 | Ross | 342/40 |
| 4,167,007 | 9/1979 | McGeoch et al. | 342/40 |
| 4,174,519 | 11/1979 | Poli | 342/40 |
| 4,180,815 | 12/1979 | Hill | 342/40 |
| 4,314,247 | 2/1982 | Oude Elberink et al. | 342/40 |
| 4,642,638 | 2/1987 | Callahan, Jr. | 342/45 |
| 4,761,651 | 8/1988 | Matsunaga | 342/40 |

Primary Examiner—Thomas H. Tarcza
Assistant Examiner—John B. Sotomayor

Attorney, Agent, or Firm—Howard G. Massung

[57] ABSTRACT

An improved Leading Edge Detector/Pulse Quantizer (LED) for use in a pulse code communications system. A prior LED included three shift registers for storing in relative time order, according to the time of reception of video pulse signals by an associated receiver, (a) pulse leading edges, (b) pulse trailing edges and (c) Quantized video (quantized video comprises a pulse having a width equal to the time the received video exceeds a threshold amplitude). The prior LED further included a plurality of logic means for examining the contents of the three registers to determine whether pulse leading or trailing edges of the received video signal were possibly missing because of interference between received video pulses and for inserting extra leading edges in the leading edge register if such extra leading edges could be logically inferred to be present.

The improvement of the invention includes expansions of the functions of the logic means for detecting and inferring the presence of leading edges and trailing edges, improved control means to insure that the logic means operate in proper sequence and improved logic means for deleting signals from the leading edge register when their presence is determined to be illogical.

20 Claims, 28 Drawing Sheets

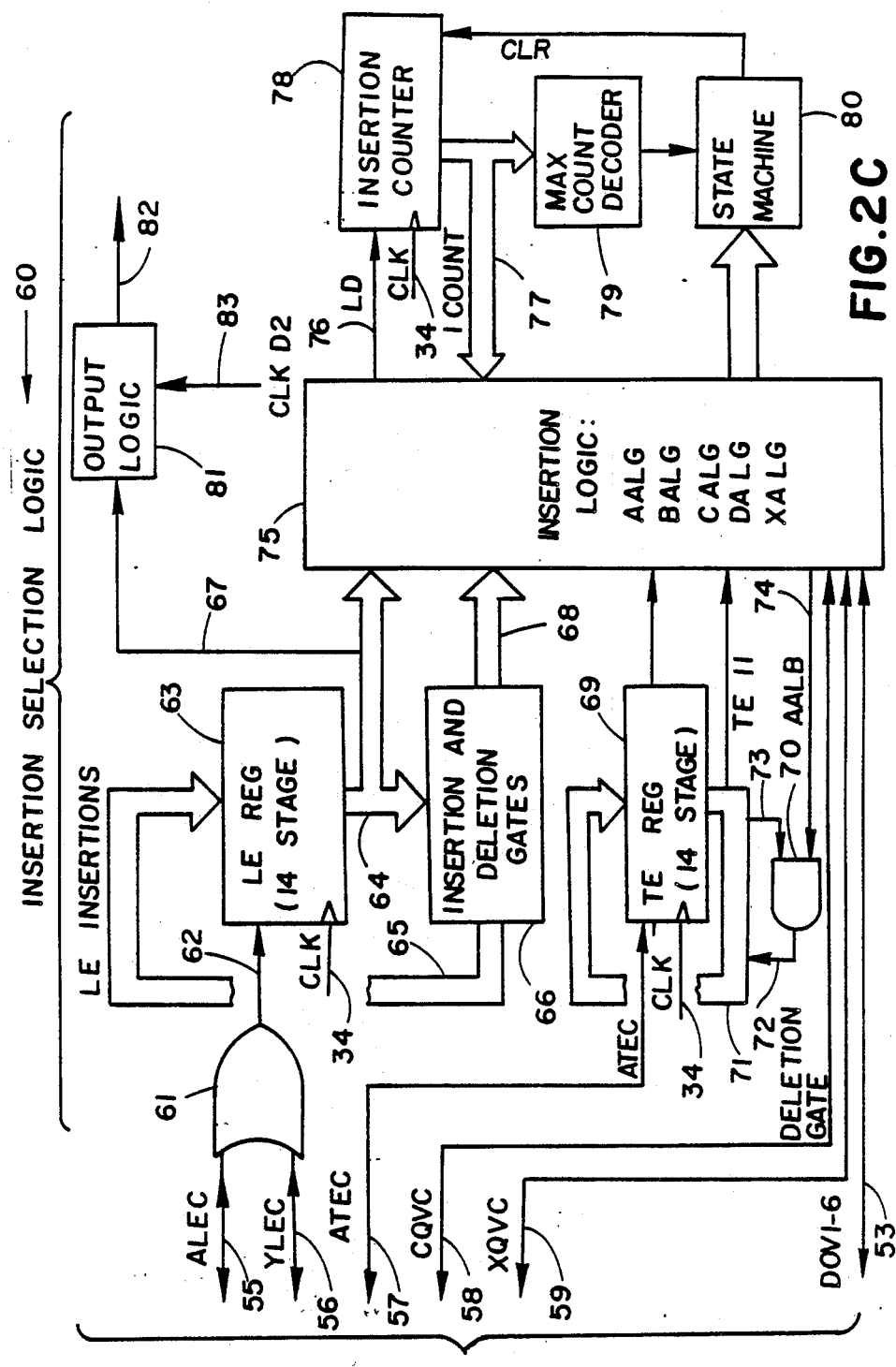

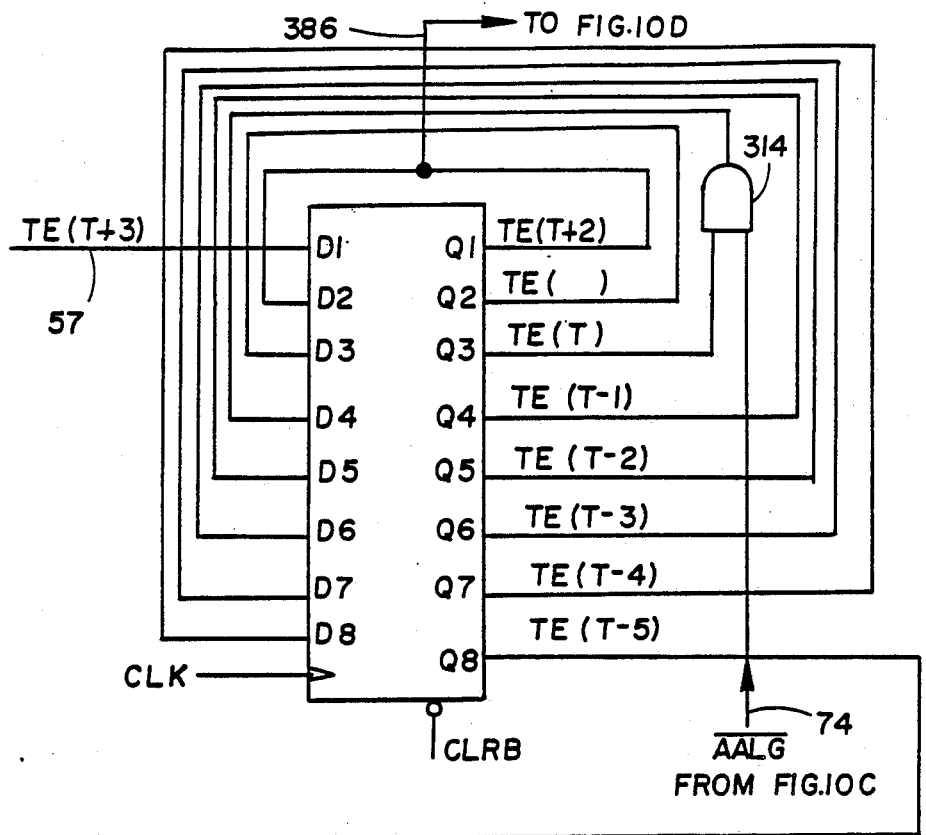
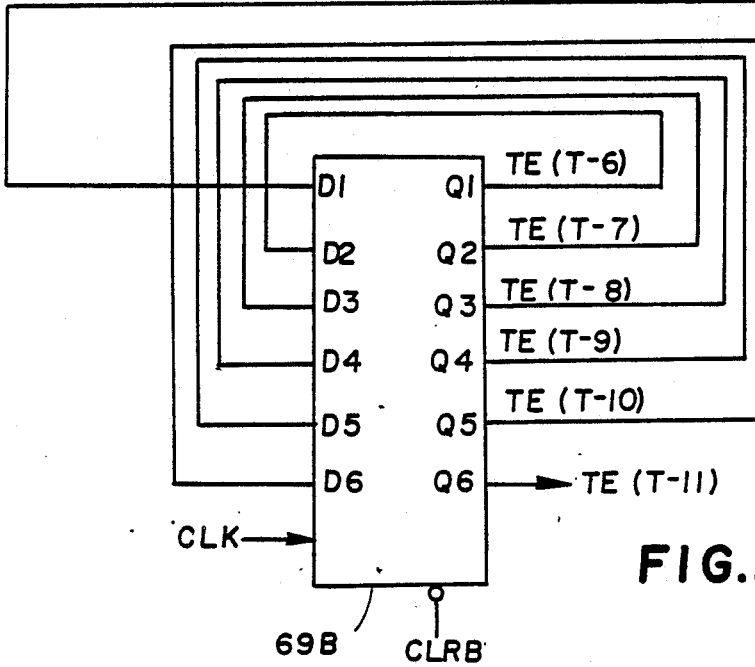
FIG.IOA-2

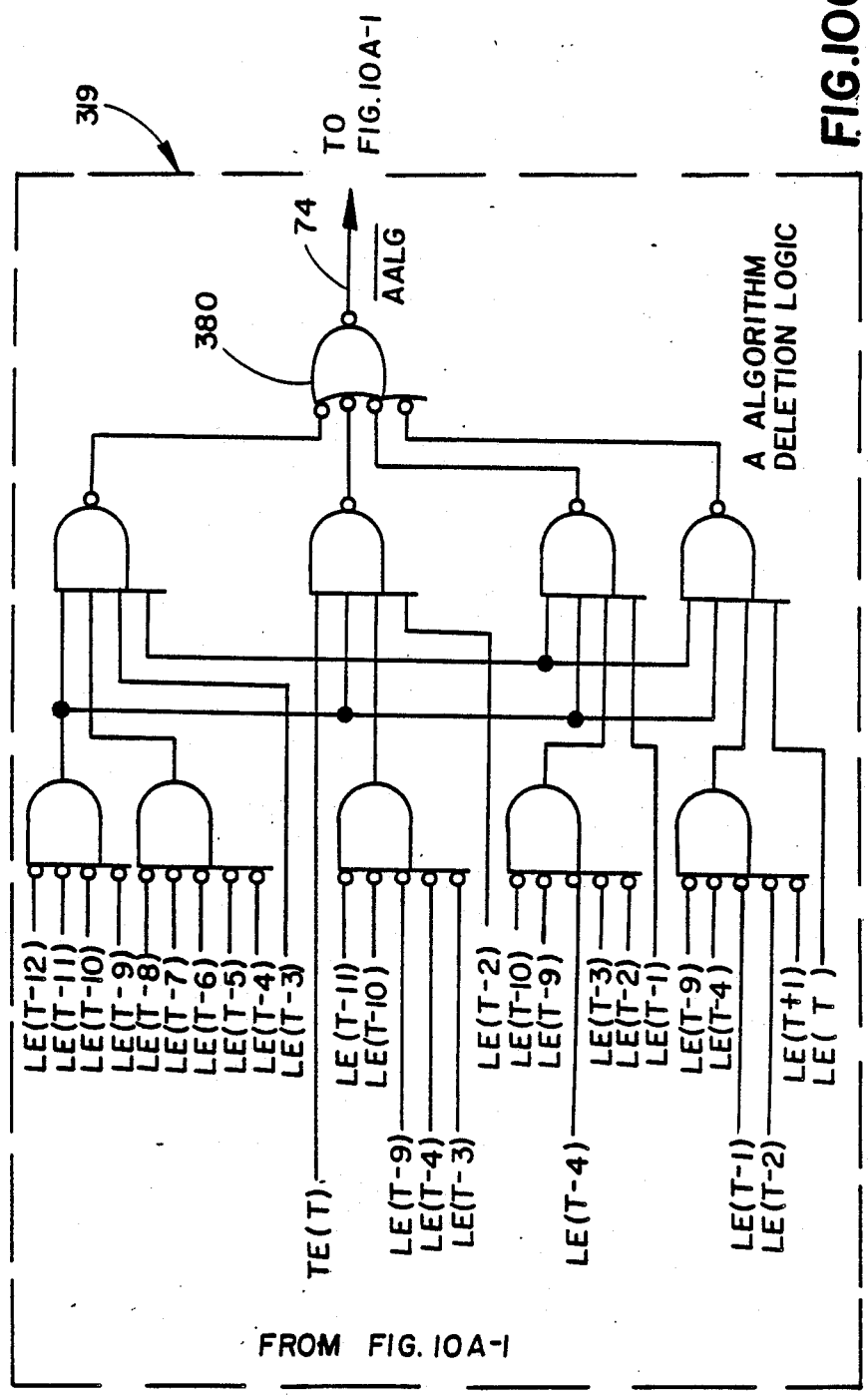

LEADING EDGE DETECTOR/REPLY QUANTIZER

FIELD OF THE INVENTION

The present invention relates generally to digital delay line decoders for Pulse Code Modulation (PCM) decoder service in Air Traffic Control Radar Beacon Systems/Selective Identification Feature (ATCRBS/SIF) and in airborne Traffic Alert and Collision Avoidance Systems (TCAS). More particularly, this invention relates to precursory processes associated with such reply decoders, namely, analog-to-digital quantization and digital processing.

BACKGROUND OF THE INVENTION

The ATCRBS/SIF system presently in use employs ground based interrogator transmitters which query airborne transponders within the range of operation of each. Associated with each interrogator are a reply receiver, quantizer, reply decoder, and reply processor which together process received replies of the airborne transponders. These replies contain informational pulses which may identify the aircraft, convey altitude information or convey other data, depending upon interrogation coding. Traffic Alert and Collision Avoidance Systems (TCAS) of the "active" (interrogating) type include similar airborne interrogators and transponders to intercommunicate with other aircraft. Several pulse-coding modes are in use for interrogation and reply signals; the present invention accommodates all presently used modes.

A large number of beacon interrogators are in operation in many metropolitan areas. Typically, large numbers of aircraft are within operational range of one or more or these interrogators. Consequently, replies from several aircraft will often be received simultaneously by each interrogator station. These received replies are of two types; valid and false. Only those replies which are valid responses to a particular interrogation are of interest to the respective interrogator. Other replies, known as False Replies Unsynchronized In Time (FRUIT), cause a major processing problem which becomes acute in high reply density areas.

Hardware means are included in reply decoders and software means are included in reply processors at the interrogation stations to minimize effects of such FRUIT when "garbled" replies exist, i.e., where two or more replies arrive at the interrogator receiver at approximately the same time. Detection and degarbling of overlapping valid replies is a second major problem confronted by reply decoders. It is desirable to eliminate reply garbling without losing valid replies.

The reply formats prescribed for the ATCRBS/SIF reply modes include one leading and one trailing framing pulse separated by 20.3 microseconds. The trailing pulse may be followed by a Special Position Identification (SPI) pulse, or by subsequent pairs of framing pulses at a 4.35 microsecond interval. Valid reply pulse trains are recognized by this spacing between framing pulses, and informational pulses are synchronized for decoding based upon the time of the initial framing pulse. This function is accomplished by a bracket decoder circuit on a digital delay line in the reply decoder. The reply format gives rise to the third problem plaguing reply decoders and processors when overlapped or closely spaced replies are present. Replies known as "phantom replies" occur whenever two framing or informational pulses arrive at the reply decoder with the same time separation between them (20.3 microseconds), as two valid framing pulses. Obviously, it is desirable to identify and discriminate against phantom replies while saving those valid informational pulses which may have been complicit in formating of the phantom.

PRIOR ART

It became obvious to those skilled in the art that valid replies could be separated from FRUIT more readily if each 0.45-microsecond-wide pulse could be regenerated into a narrower pulse. Such a process would enable the reduction of the number of garbled replies and would facilitate recognition of phantoms. ATCRBS/SIF decoders progressed to the state where raw video pulses were being quantized into positive slope, quantized video, and negative slope signals (ATCRBS Specification, FAA-E-2716, August 2, 1982), and rudimentary algorithms had been developed for the required reply digitizer (leading edge detector). This leading edge detection scheme has been successfully employed in several operational systems, most notably in the TCAS II system. The TCAS II system employs a Leading Edge Detector/Pulse Quantizer invented by B. J. Lyons and M. A. Martin and described by them in a report titled "Simulation of Enhanced TCAS-II Signal Processor Hardware Design", pp. 2-1 through 2-11, Report No. BCD-TR-092, prepared under U.S. Dept. of Transportation Contract No. DTFA01-82-10019, available to the public through National Technical Information Service, Springfield, VA 22161.

The referenced Lyons and Martin Leading Edge Detector/Pulse Quantizer contains several features intended to cope with the above-mentioned problems of FRUIT, garble and phantom replies. Hereinafter, references to the prior art are primarily directed to the Lyons and Martin device.

First of these features is the provision of a quantizer which validates the three quantizer signals to ensure that no secondary signal event has occurred in the 60-nanosecond period immediately preceding the current primary event.

A second feature is the provision of means to prevent narrow signal events of less than 70 nanoseconds duration from generating quantizer outputs. In the detector, three quantized but unsynchronized datastreams are pulse-stretched to ensure that signal events of 67 nanosecond or greater width will be retained in the synchronization process which follows. Each of the three datastreams are synchronized to a system clock and may contain pulses of any whole multiple of the clock period. Digital delay lines (serial shift registers) are used to provide time for digital examination of the three datastreams. This examination serves to detect actual leading and trailing edge transitions, plus actual quantized video. These interim processing signals are generated when transitions and levels of the quantized inputs, and the time sequence thereof, conform to the algorithmic rules of the system logic design.

Because of noise and overlapping replies, none of the three quantizer outputs necessarily has a 1:1 relationship with actual reply pulses; i.e., a reply pulse could be missing, undetectable, or masked for several reasons. Conversely, a false signal could appear due to noise at the lower extremity of video bandpass.

Accordingly, another important feature of the referenced decoder is that digital processing within the leading edge detector conforms to several algorithms which accommodate various sets and subsets of quantizer signal combinations. The purpose of these algorithms is to ensure that leading edge output pulses will be generated for valid reply pulses, but that invalid quantizer inputs to the leading edge detector will be discarded. In the first instance, where the positive slope is not detected but quantized video and negative slope signals are present, the leading edge detector inserts a leading edge pulse at the estimated time, based upon positions of the other two quantizer signals, where it should have occurred. Conversely, identified pseudo events are deleted.

Still, in the referenced detector, various anomalous signal sequences can cause garbling or masking of valid replies, and weaker replies can escape detection.

It is an object of the present invention to provide improvements in the prior Leading Edge Detector/Reply Quantizer whereby improved immunity to the effects of fruit, garble and phantom replies is gained.

It is another object of the invention to provide improvements in the prior Leading Edge Detector/Reply Quantizer whereby fewer false replies will be accepted as valid replies and more valid replies, formerly rejected as false, are recognized as valid replies.

It is a further object of the invention to provide a reply quantizer which recognizes and time-marks each video signal event amongst contemporaneous, mutually overlapping pulse trains and which correctly time-orders and separates signal events so as to minimize the number of garbled replies.

It is still another object of the invention to provide a pulse detector/quantizer for a pulse code modulation communication system having improved sensitivity to weak reply signals and improved ability to recognize valid weak reply signals that are masked by overlapping pulses.

Other objects and advantages of the invention will become evident as a complete understanding of the invention is gained through study of the following complete description and the accompanying drawings.

SUMMARY OF THE INVENTION

The present invention includes a receiver, a video detector and a video quantizer following the video detector which generates three validated signal pairs: (1) positive slope start, positive slope stop; (2) quantized video start, quantized video stop; and (3) negative slope start, negative slope stop. Use of these six derived signals ensures that secondary signal events have not occurred either immediately preceding the start of transition, or immediately following the end of transition. Each signal pair is combined into single unsynchronized datastream wherein transitional pulses are stretched to preclude their loss in the subsequent process of synchronization. Synchronization is accomplished by clocking the datastreams into three separate digital delay lines (serial registers). Datastreams propagated in these registers contain pulses of widths equal to whole multiples of the clock period.

A multiplicity of taps on the three registers allows congregate examination of signal events v. time sequence. Combinational logic circuits, functioning in accordance with the rules of several detection algorithms, perform this examination to detect actual leading and trailing edges and actual quantized video. The "actual" leading and trailing edge datastreams output from combinational logic containing a plurality of one-clock wide constituent pulses, are then propagated through leading edge (LE) and trailing edge (TE) registers. The multiplicity of taps on these registers connect to insertion and deletion logic circuits. These circuits insert, at estimated time positions, probable leading and trailing edges where they were not directly detected, and also delete pseudo edge pulses from the datastreams.

In the preferred embodiment, insertion and deletion circuits function under control of a state machine, an insertion time-slot counter, and a maximum count decoder. The regenerated leading edge datastream, wherein constituent pulses are always one clock wide, is resynchronized in output logic under control of system clock. Output logic of the preferred embodiment precludes contiguous pulse pairs: i.e., a one-clock minimum quiescent period follows each constituent pulse.

BRIEF DESCRIPTION OF THE DRAWINGS

FIGS. 2A, 2B and 2C are an overall block diagram of the video quantizer and leading edge detector.

DESCRIPTION OF THE PREFERRED EMBODIMENTS

Figure 1:
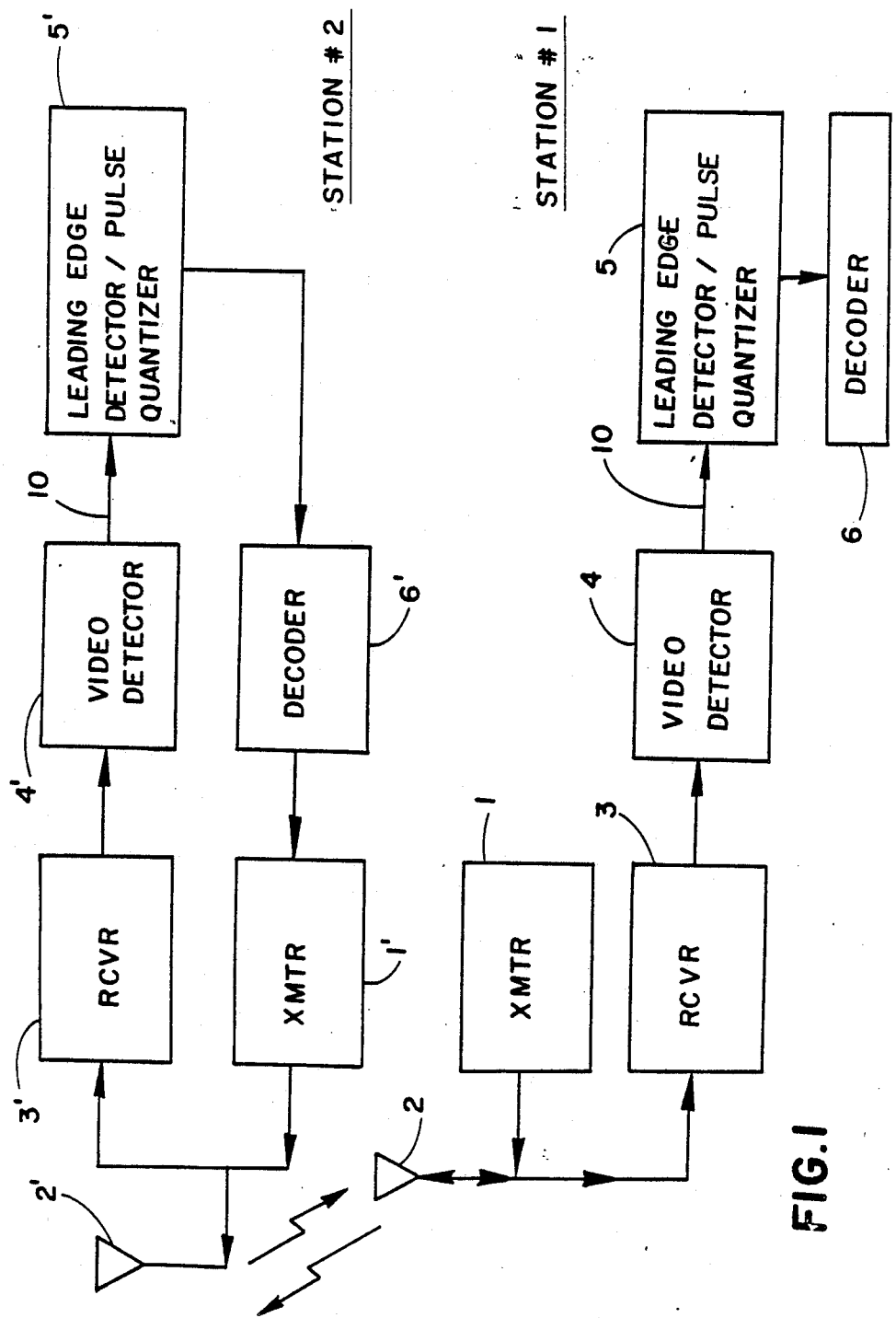
FIG. 1 is a simplified block diagram of a pulse code modulation system incorporating the present invention.

Before embarking on a detailed description of the invention, it will be helpful to an understanding thereof to consider the general aspects of the system of which the invention is a part and the environment and purpose of such a system. FIG. 1 is a simplified block diagram of a pulse code communications system as used for purposes of air traffic control, aircraft collision avoidance or military identification. An interrogator, station #1, transmits a pulse coded interrogation signal through transmitter 1 and antenna 2 requesting station #2 to respond with particular information, such as its assigned identification number, its altitude, station type or other information. The interrogation signal follows a prescribed and recognized format which commonly includes two framing pulses, separated from one another by a definite amount of time, marking the beginning and the end of a message. The message is contained between the framing pulses in the form of pulses which are present at particular times within the framing pulses.

The interrogation signal transmitted by station #1 is received by a transponder, station #2, through an antenna 2' and receiver 3', video detector 41 and applied to a leading edge detector/pulse quantizer (LED/PQ) 5', described in detail hereinafter. The output of LED/PQ 5' is applied to a decoder 6' which interprets the message content of the interrogation signal and formulates a pulse coded reply containing the information sought by the interrogator. The coded reply signal is then transmitted to the interrogator, station #1, via transmitter 1' and antenna 2'.

The reply signal from station #2 is received by station #1 through antenna 2 and receiver 3, video detector 4 and applied to leading edge detector/pulse quantizer (LED/PQ) 5, similar to LED/PQ 5'. The output of LED/PQ 5 is applied to a reply decoder 6 which interprets the reply message and forwards the message for utilization, as by a display or by a reply processor computer.

The roles of station #1 as interrogator and station #2 as transponder may be interchanged. Either or both stations may be ground based or airborne, fixed or mobile. The problems that the present invention are intended to overcome arise most often when the interrogator station is ground based, such as an air traffic control center, and there are several transponders that receive and respond to the same interrogation signal at substantially the same time. Then the interrogator will receive several response messages which may be superimposed or overlapped or otherwise interfere with one another. All interrogation messages of all stations are each transmitted on the same frequency and all reply messages of all stations are transmitted on the same frequency, different from the frequency of the interrogation channel. The several reply messages all arrive at the interrogating station on the same carrier frequency and cannot be separated from one another by carrier frequency distinctions. The solution to the problem of separating interfering reply messages is dependent on the capability of the system to recognize and clock the start of a pulse and the end of a pulse and whether the pulse was present during the interval between pulse start and pulse end. These capabilities are enhanced by the ability of the system to infer the presence of missing pulses and to delete false pulses.

The tasks of determining and clocking the start of a pulse, the end of a pulse and the presence of the pulse during the interval between pulse start and pulse end and those of inferring the presence of missing pulses and deleting false pulses are assigned to the Leading Edge Detector/Pulse Quantizer (LED/PQ), which is the subject of the present invention. When a valid pulse datastream is established by the LED/PQ, the task of separating the pulse stream into valid interrogation or reply messages falls upon the reply decoder 6. The hardware implementation of the LED/PQ of the invention will next be described with reference to FIGS. 2 and 3.

Figure 2A:
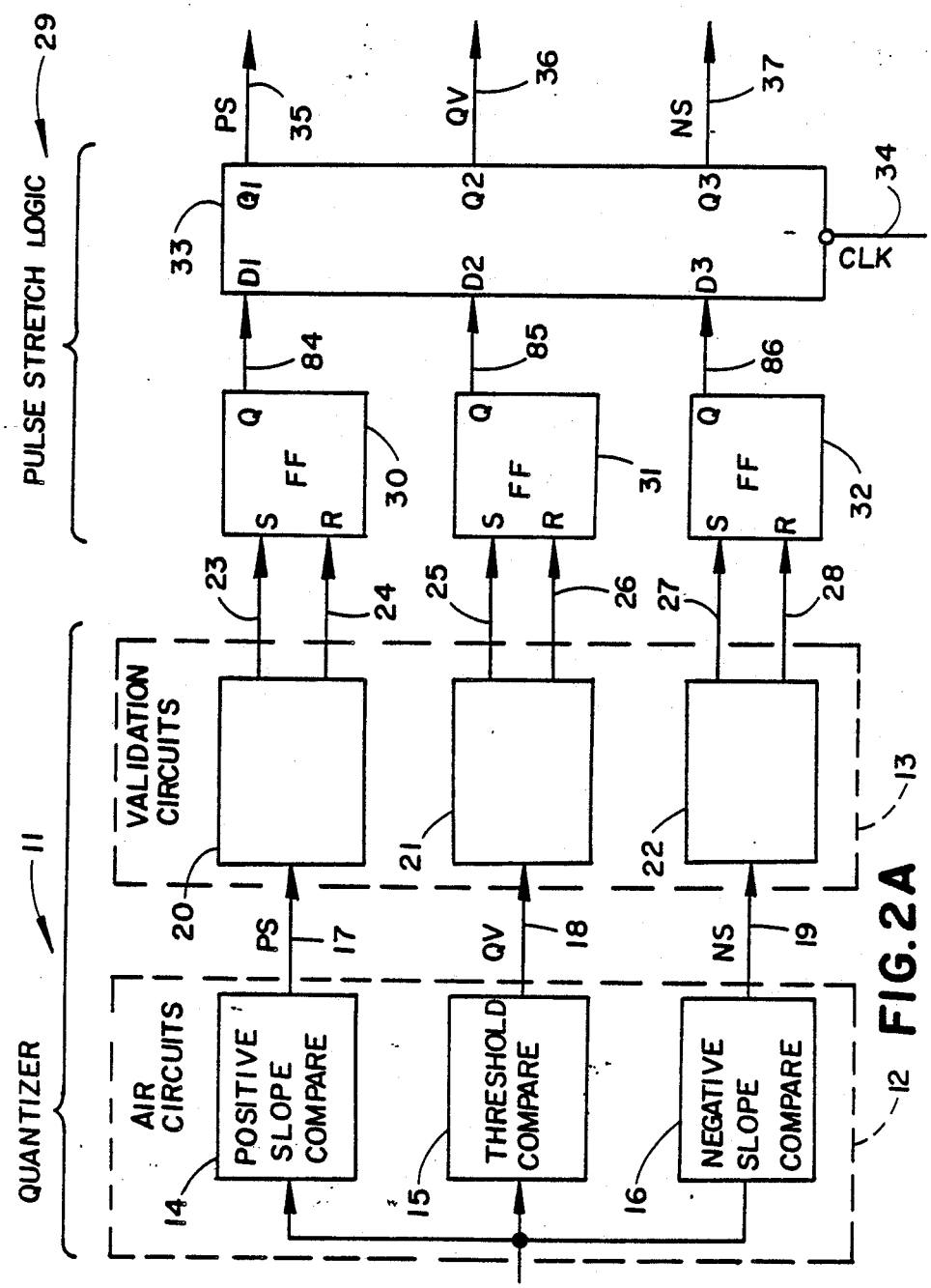
Figure 2B:
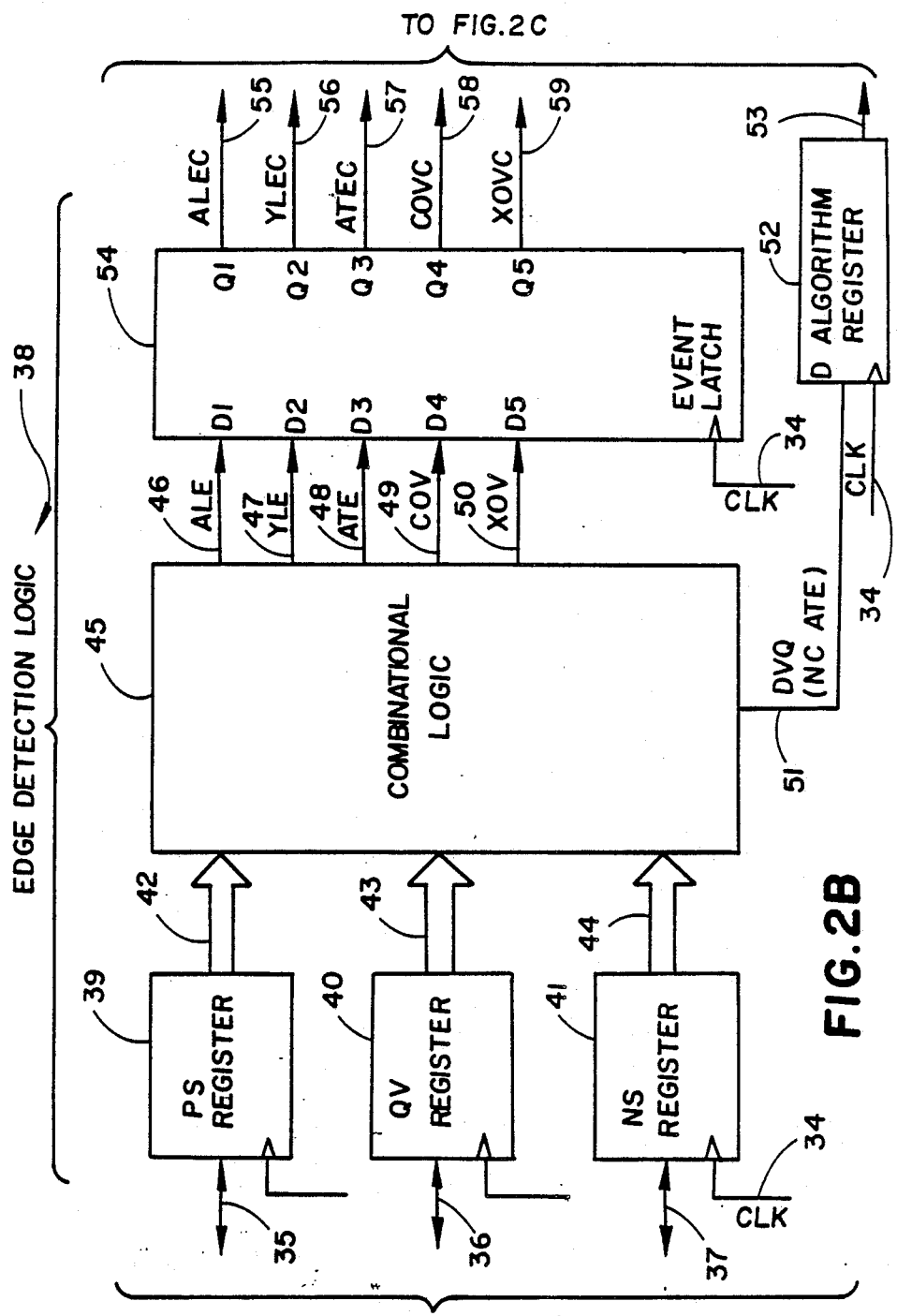

Referring to FIGS. 2A, 2B, and 2C raw analog video input 10 from the video detector 4 (FIG. 1) is applied to three circuits 14–16 which function as analog-to-digital converters 12 to produce three quantized level signals, i.e., all signals are of uniform amplitude. Threshold comparator 15 generates Quantized Video Level (QVL) 18 which persists at logic high level as long as the amplitude of the raw video input 10 exceeds a specified threshold. Positive slope comparator 14 produces Positive Slope Level (PSL) 17 which persists at logic high level for as long as the amplitude of the raw video input 10 is increasing at a specified rate. Negative slope comparator 16 generates Negative Slope Level (NSL) 19 which persists at logic high level for as long as the amplitude of the raw video input 10 is decreasing at a specified rate. These event- and time-related signals are applied to validation circuits 13 which include three identical validation circuits 20, 21 and 22. Each of these circuits produces an event start signal 23, 25 and 27, and event stop signal 24, 26, and 28, respectively, for valid events of 67 nanoseconds or greater duration. Each signal pair is used to alternately set and reset an RS type flip-flop, 30, 31 and 32, to stretch events that are narrow but which exceed 67 nanoseconds duration. Pulse stretched outputs 84, 85 and 86 are synchronized to a leading edge detector clock 34 by latching them into a triple D-type flip-flop 33. The resulting synchronized signals, PS 35, QV 36, and NS 37, are then entered into and propagated through digital delay lines (serial shift registers) 39, 40, and 41, respectively. Combinational logic 45 examines event data in these three registers, where each register stage represents a time slot: i.e., one clock period.

Combinational logic 45 includes a multiplicity of logic circuits. Some of these circuits perform logic operations implicit in the algorithms of the above-referenced prior leading edge detector while other circuits function in accordance with improved algorithms which will be described hereinafter. D-type latch 54 reclocks actual events detected by combinational logic 45 to produce the following resynchronized logic signals:

Actual Leading Edge Clocked (ALEC) 55;
Y actual Leading Edge Clocked (YLEC) 56;
Actual Trailing Edge Clocked (ATEC) 57;
C algorithm Quantized Video Clocked (CQVC) 58;
X algorithm Quantized Video Clocked (XQVC) 59.

Where no actual trailing edge is detected after QVL has been high for 10 consecutive clock periods, combinational logic 45 applies separate DQV input 51 to D algorithm register 52, which serves as a digital delay line to accommodate the six timing cases of the D algorithm, as hereinafter described.

The latched actual leading edge detection signals, 55 and 56, from latch 54 are logically ORed by OR gate 61 and shifted into 14-stage- LE register 63. The latched actual trailing edge signals 57 from latch 54 are shifted into a similar TE register 69. Algorithm generated leading edge signals 53, 58 and 59 are applied directly to insertion/deletion logic section 75. Insertion/deletion logic accomplishes the following functions: (1) it allows actual leading and trailing edges to pass where the criteria established by the several algorithms are met; (2) it inserts leading edges by means of gates 66 where actual edges are not present but are estimated to be; (3) it deletes, by means of deletion gates 66 and 70, adjacent edges which are too close together.

Insertion counter 78 and state machine 80 together control and time the insertion logic operations. Insertion count of counter 78 begins with an initial leading edge from which all subsequent edges are measured.

Insertion counter 78 is enabled, cleared, and inhibited by state machine 80 operating in conjunction with maximum count decoder 79. Decoder 79 provides input control to state machine 80 and thereby prevents rollover of insertion counter 78 and the attendant false edge generation which possibly could result.

The corrected leading edge data stream propagating in register 63 is output on line 67 to output logic section 81, where it is reclocked. CLKD2 83 input is one-half of system clock frequency, typically 8 MHz. Sum Leading Edge (SLE) output 82 is forwarded to the associated Reply Decoder 6 (FIG. 1).

Figure 3:
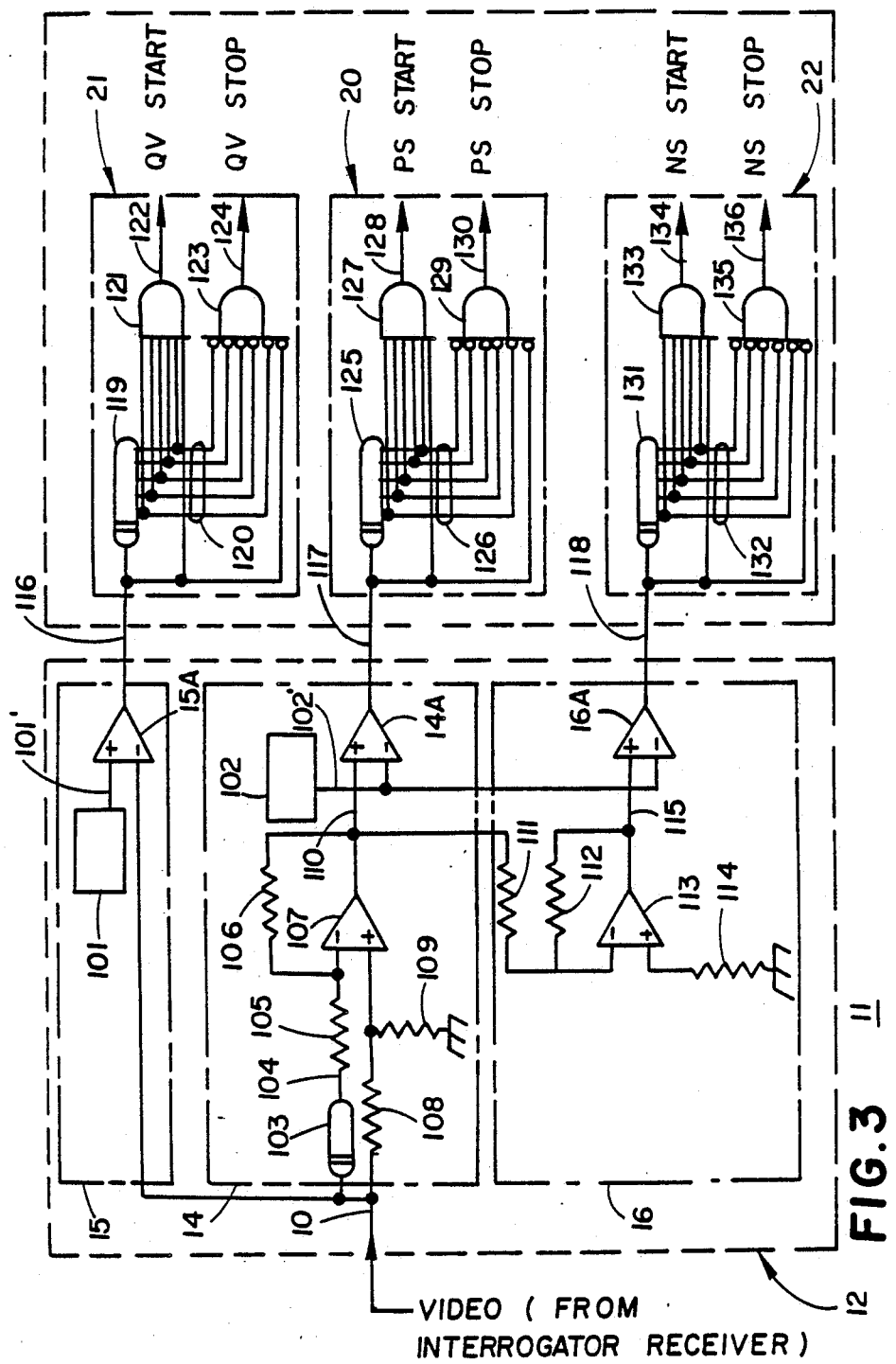
FIG. 3 is a schematic diagram of the video quantizer 11.

FIG. 3 is a schematic diagram of the comparator circuits 12 and validation circuits 13 of FIG. 2A. Referring to FIG. 3, raw video input 10 is applied to differential comparator 15. Threshold for comparator 15 is developed by a conventional threshold circuit 101 and the actual threshold voltage is a function of the desired Minimum Triggering Level (MTL). When the amplitude of the raw video input rises above the predetermined threshold, output 116, which had been at logic-low level during the quiescent state, rises quickly to logic-high level. As is the case with all conventional differential comparators, an input change of only a few millivolts above the present threshold will switch output 116 from low level to high level. Thus, a quantized video pulse is generated that is essentially rectangular, i.e., with steep rise and fall and constant amplitude, is applied to validation circuit 21 which includes a delay line 119, a positive AND gate 121, and a low-level (negative) AND gate 123. Aggregate delay of 119 is 60 nanoseconds typically, with five 12-nanoseconds segments. Taps 120 are applied to positive AND gate 121 to develop QV START output 122, and to negative AND gate 123 to generate QV STOP output 124. The RS flip-flop 30 (FIG. 2) which is driven by output 116 requires approximately 7 nanoseconds setup and hold time; therefore, the minimum width input that will produce a digitized output form RS flip-flop 30 is 67 nanoseconds rather than the 60 nanosecond characteristic of delay line 119, FIG. 3. If any noise spike or other spurious event of less than 70 nanoseconds duration is applied to validation circuit 21, it will not produce either output, 122 or 124.

Differential amplifier 107 functions as a conventional slope detector to generate a slope signal output at 110 which is bipolar with respect to quiescent level. Raw video input is applied undelayed to the non-inverting input of differential amplifier 107. The raw video 10 is delayed typically 86 nanoseconds in delay line 103 and then applied to the inverting input of amplifier 107. Amplifier 107 gain, which is determined by scaling resistors 105, 106, 108 and 109, and video levels are chosen such that when undelayed video slope gradient exceeds 6 dB/86 nanoseconds, slope-detected output 110 will exceed the 6 dB threshold 102' provided by conventional threshold circuit 102. Differential comparator 14A output (117) then quickly switches from logic low level to logic high. Validation circuit 20 is identical to validation circuit 21 which was previously described.

Differential amplifier 113 is arranged with scaling resistors 111, 112 and 114 to form a unity-gain inverter. The input to inverter 113 is the output 110 of slope detector 107. The inverted slope detector signal 115 will exceed the 6 dB threshold 102', when the negative slope gradient of the raw video 10 exceeds 6 dB/86 nanoseconds. The negative slope is thus quantized at output 118 of inverter 16A and applied to validation circuit 22. Validation circuit 22 is identical to previously described validation circuit 20.

Figure 4:
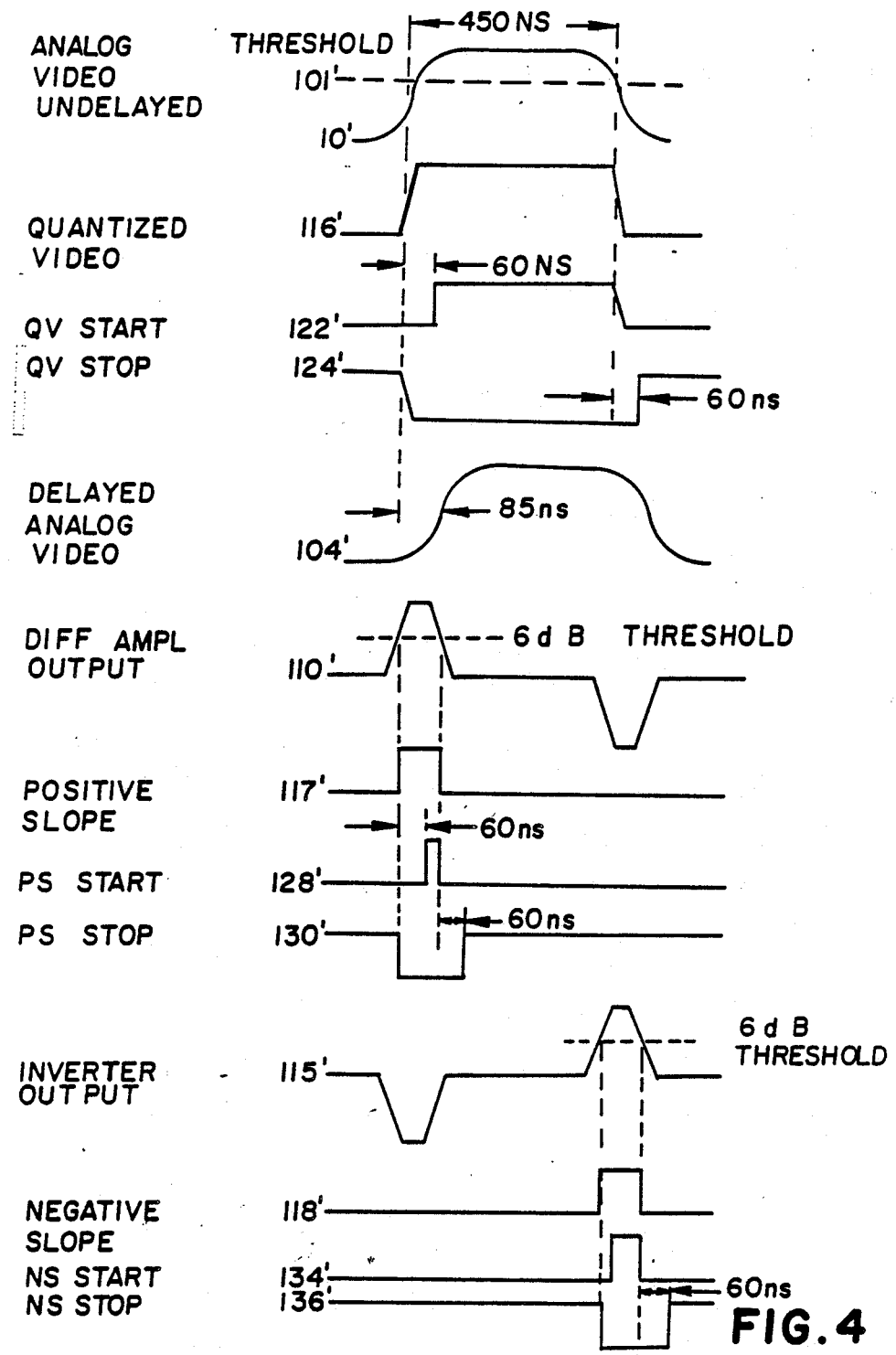
FIG. 4 is a diagram showing quantizer waveforms.

In the FIG. 4 timing diagram, the idealized waveforms shown are referenced to schematic FIG. 3 as primes of the respective circuit points where they appear.

Referring to FIG. 4, the raw video input 10' is shown as a single idealized pulse of 450 ns. duration. In practice, the pulse may be longer or shorter than 450 ns. and have a variable amplitude due to interference of the kinds previously described. The output 116' of differential amplifier 15A rises rapidly to a high logic level at the time pulse 10' crosses the threshold 101' established by threshold circuit 101. The quantized video level signal 116' is propagated into 60 ns. delay line 119. When the leading edge of 116' reaches the end of delay line 119, if 116' is longer than 60 ns. all taps on delay line 119 will be at high level and gate 121 will be enabled, generating quantized video (QV) start 122'. Simultaneously, when the leading edge of 116' initially rises to a high level, gate 123 is inhibited and its output, QV stop 124', drops to a low logic level.

In comparator 14A, input 10' is applied to 86 ns. delay line 103, generating delayed video 104'. Differential amplifier 107 generates bi-polar waveform 110' which rises to a positive level during the time that the amplitude of the undelayed video 10' is greater than the amplitude of the delayed video 104' and falls to zero level when 10' and 104' become equal. When the trailing edge of 10' begins, the amplitude of 10' becomes less than the amplitude of 104' and amplifier 107 generates the negative pulse portion of 110'.

Differential amplifier 14A compares the amplitude of 110' with the output 102' of threshold circuit 102 and generates positive slope level output 117'. Waveform 117' is propagated into 60 ns. delay line 125 and gates 127 and 129 operate similarly to gates 121, 123 to generate waveforms 128' and 130'.

Waveform 110' is inverted by differential amplifier 113 to produce waveform 115'. Differential amplifier 16A compares 115' with threshold 102' to generate negative slope level 118' which is propagated into 60 ns. delay line 131. Gates 133 and 135 operate similarly to gates 121 and 123 to generate NS start 134' and NS stop 136' waveforms.

Figure 5:
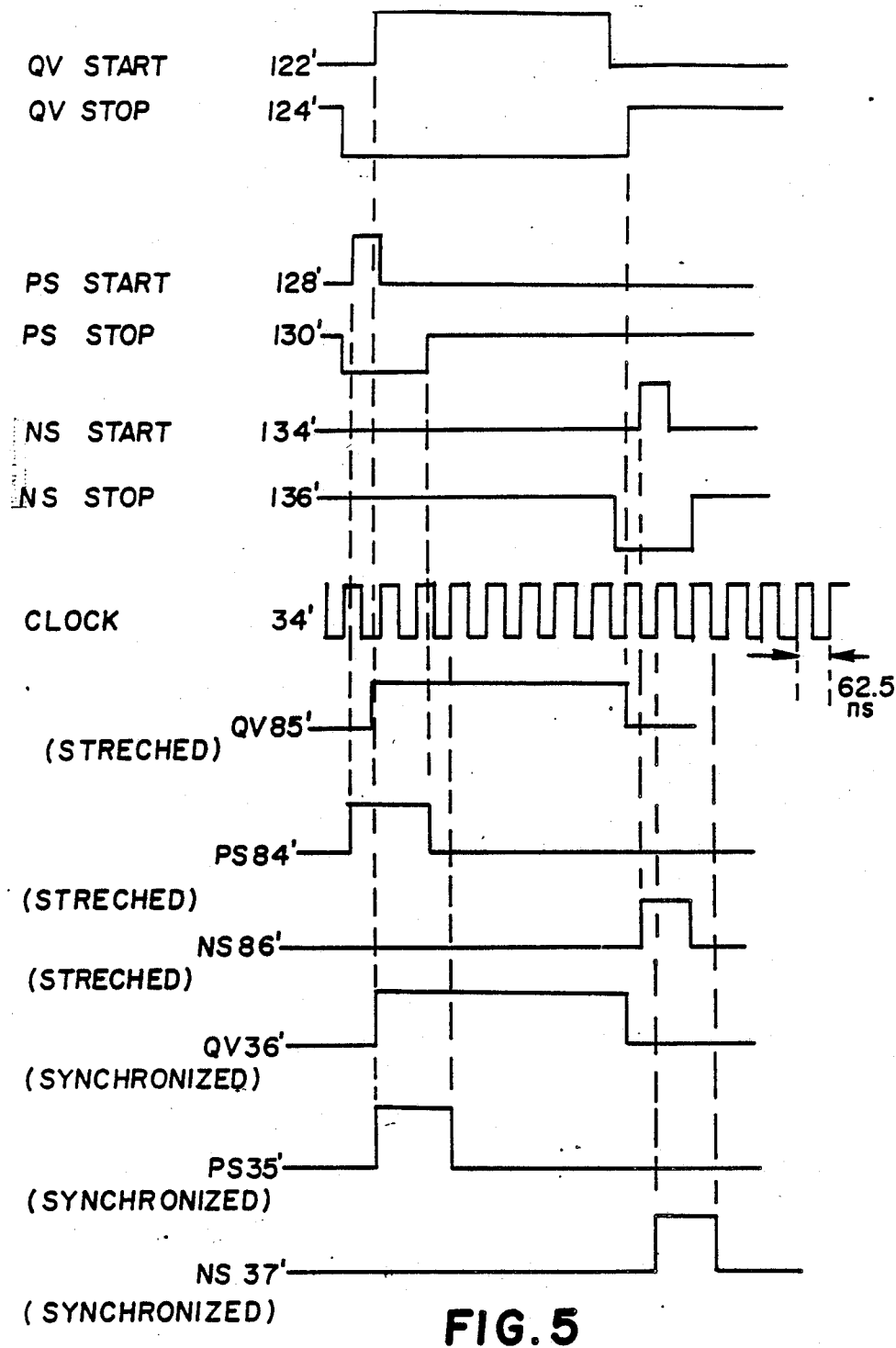
FIG. 5 is a diagram showing pulse stretch waveforms.
Figures 1, 10A:
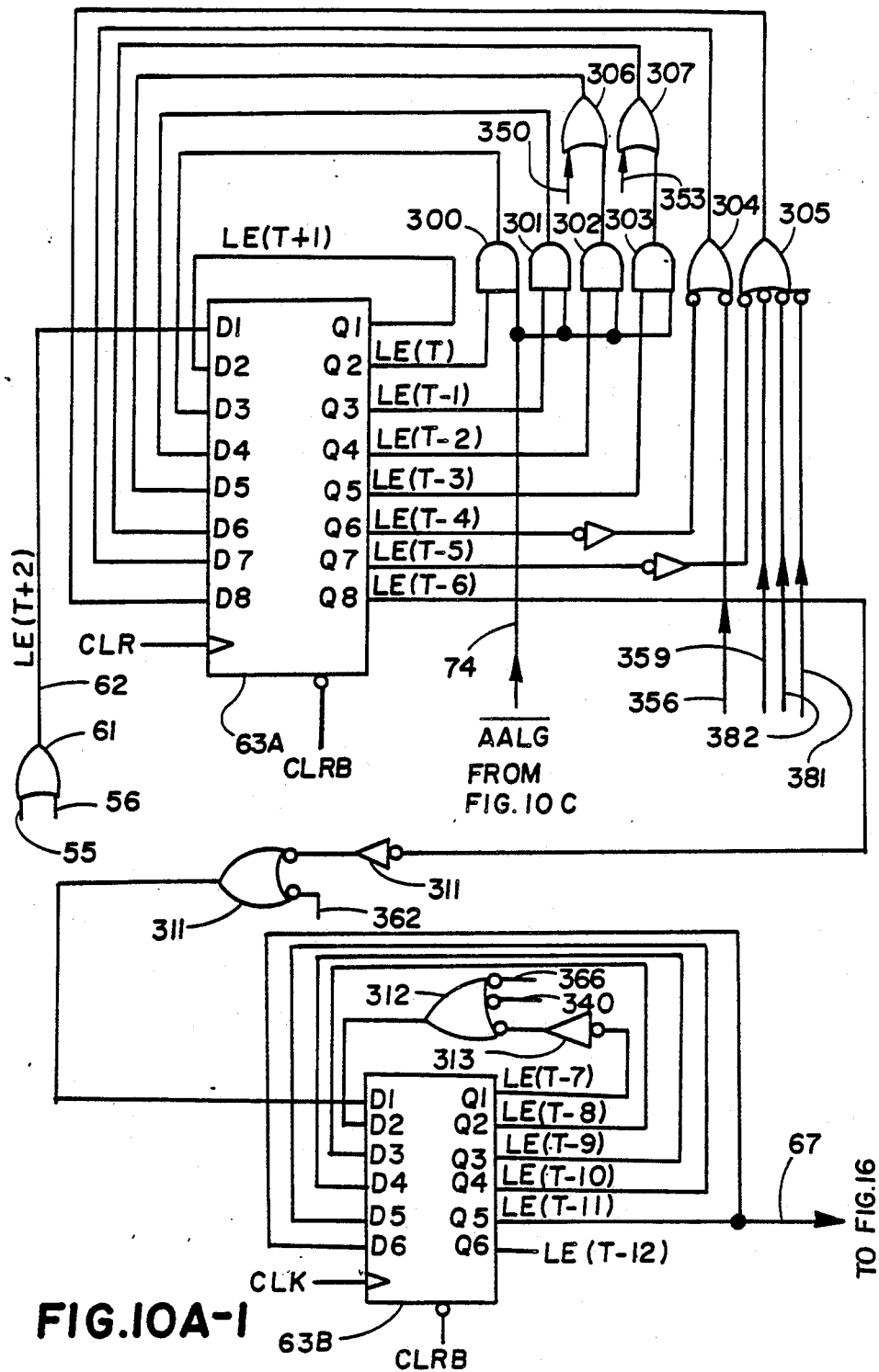
FIGS. 10A, 10B, 10C and 10D are a schematic diagrams of insertion/deletion logic section 60.
Figure 10B:
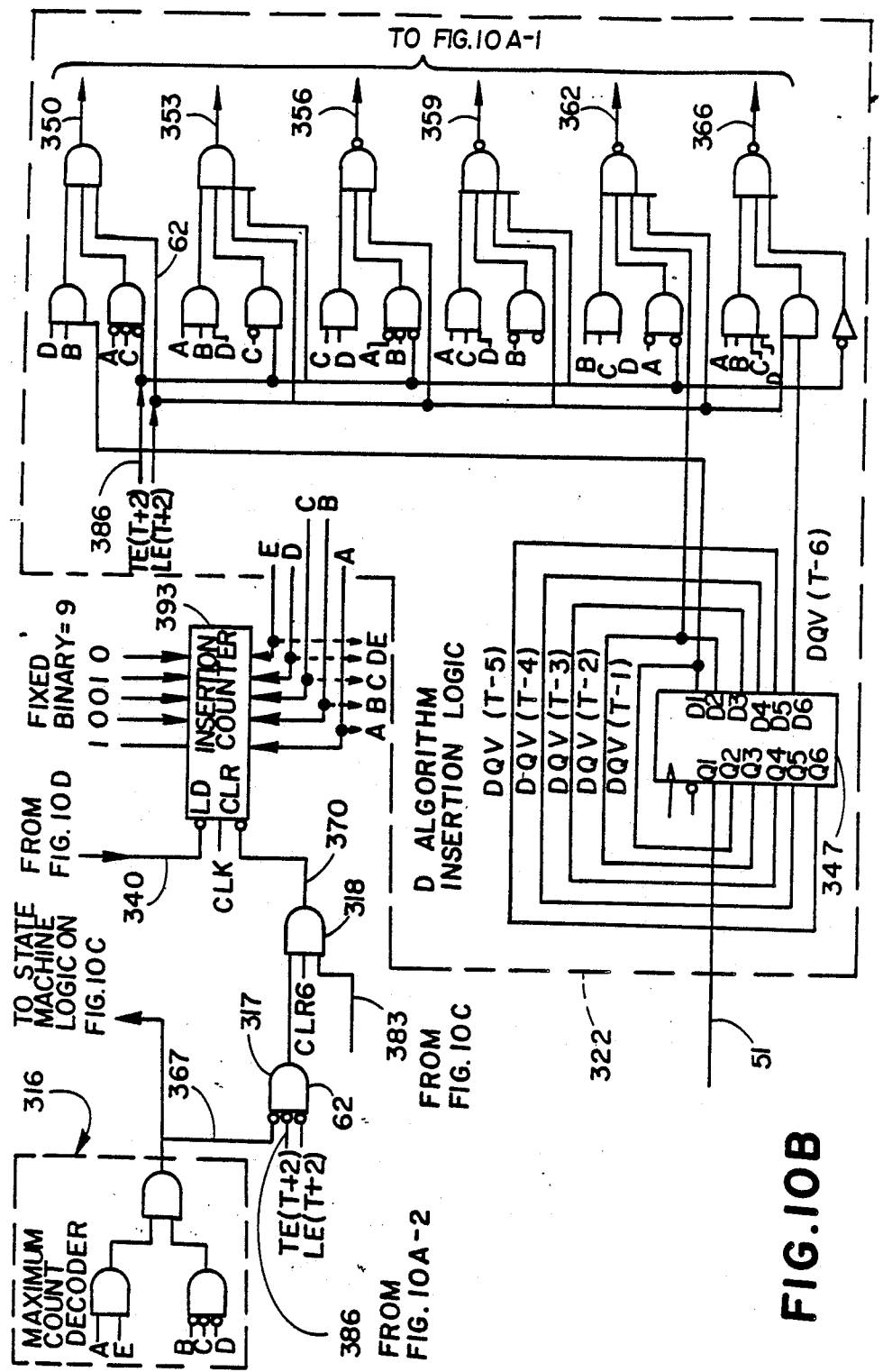
Figures 2, 10C:
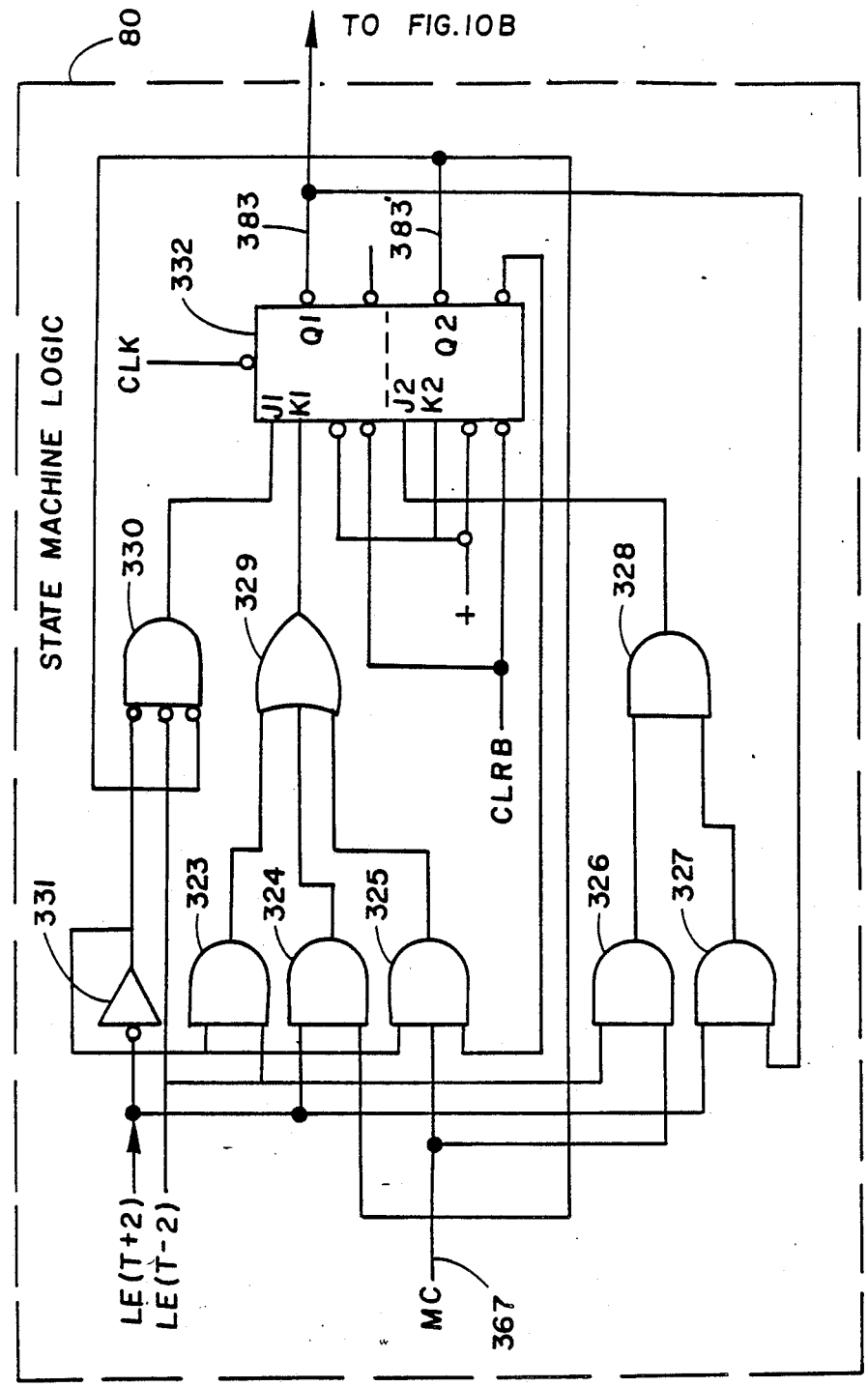

In the FIG. 5 timing diagram, the idealized waveforms shown are referenced to FIG. 2 as primes of the respective circuit points where they appear.

Referring to FIGS. 2 and 5, pulse stretch logic 29 comprises three RS flip-flops 30–32 which are respectively set and reset by the outputs of validation circuits 20–22. The waveforms of these outputs, also seen in FIG. 4, are shown as 128', 130'; 122', 124' and 134', 136', respectively. Flip-flop 31 is set to a high level when waveform 122' transitions from low to high and is reset to low level when waveform 124' transitions from low to high, generating QV output 85'. Flip-flop 30 is similarly set and rest by 122' and 124', generating waveform 84'. Flip-flop 32 is likewise set and reset by 134' and 136' to generate 86'. Waveforms 84'–86' show the state of inputs 84–86 to latch 33 which comprises three D type flip-flops generating outputs 35'–37'.

The first rising edge of system clock 34' following an input logic level transition at any of the inputs 84, 85 and 86 will trigger corresponding logic level transition in the respective outputs 35', 36' and 57' of latch 33, provided that the minimum setup time criterion of D- tYpe flip-flop is met. Because the validation circuits 20-22 ensure that the rising edges of 122', 124', 128', 130' and 134', 136' are separated by more than 60 nanoseconds for a minimum width pulse of 67 nanoseconds, the outputs 85', 84' and 86', will be at least as wide as the system clock period (62.5 nanoseconds for 16.0 MHz clock). Thus, all event signals of this minimum width will be retained.

Synchronized outputs 35'-37' start and stop on the rising edges of clock pulses 34'. Therefore, all are an integral number of clock periods in duration. Depending on the clock phase at the time of appearance of the start and stop signals for positive slope and negative slope, outputs 35' and 37' may be either one or two clock periods long. Quantized Video Synchronized (QVC) 36' will normally be 7 clock periods wide, although noise or overlapping pulses, or even normal variation of a weak signal, could alter that width to some other whole multiple of clock periods.

Referring to FIG. 6, edge detection logic section 38 (FIG. 2) includes three similar time-slot shift registers: Positive Slope (PS) register 39, Quantized Video (QV) register 40, and Negative Slope (NS) register 41, each of which has a multiplicity of taps 42, 43, and 44, respectively. These time-slots taps time-order the PS, QV, and NS events so that the several combinational logic circuits, 200, 201, 202, 204, 205, and 206, can monitor and correlate event sequence in the contemporaneous data streams being propagated in time-slot registers 39, 40, and 41.

In the statements of algorithms to follow, the terms "(T)", "(T+1)", "(T−1)" etc. have the following meanings:

"(T)" means the signal state at tap T located intermediately along the length of the particular one of registers 39-41 to which the algorithm refers. T is the particular clock cycle relative to which signal events are judged for logic purposes.

"(T−1)" means the signal state at the tap located one clock period ahead of tap T, i.e. the tap next adjacent to tap T between tap T and the register end stage.

"(T+1)" means the signal state at the tap located one clock period behind tap T, i.e. the tap next adjacent tap T between tap T and the input stage to the register.

All register taps are spaced apart by integral numbers of clock periods. Thus signal state at a time two clock periods prior to "T" would be determined by the signal state at tap (T−2) and signal state at a time two clock periods later than "T" would be determined by the signal state at tap (T +2), etc.

Figure 6A:
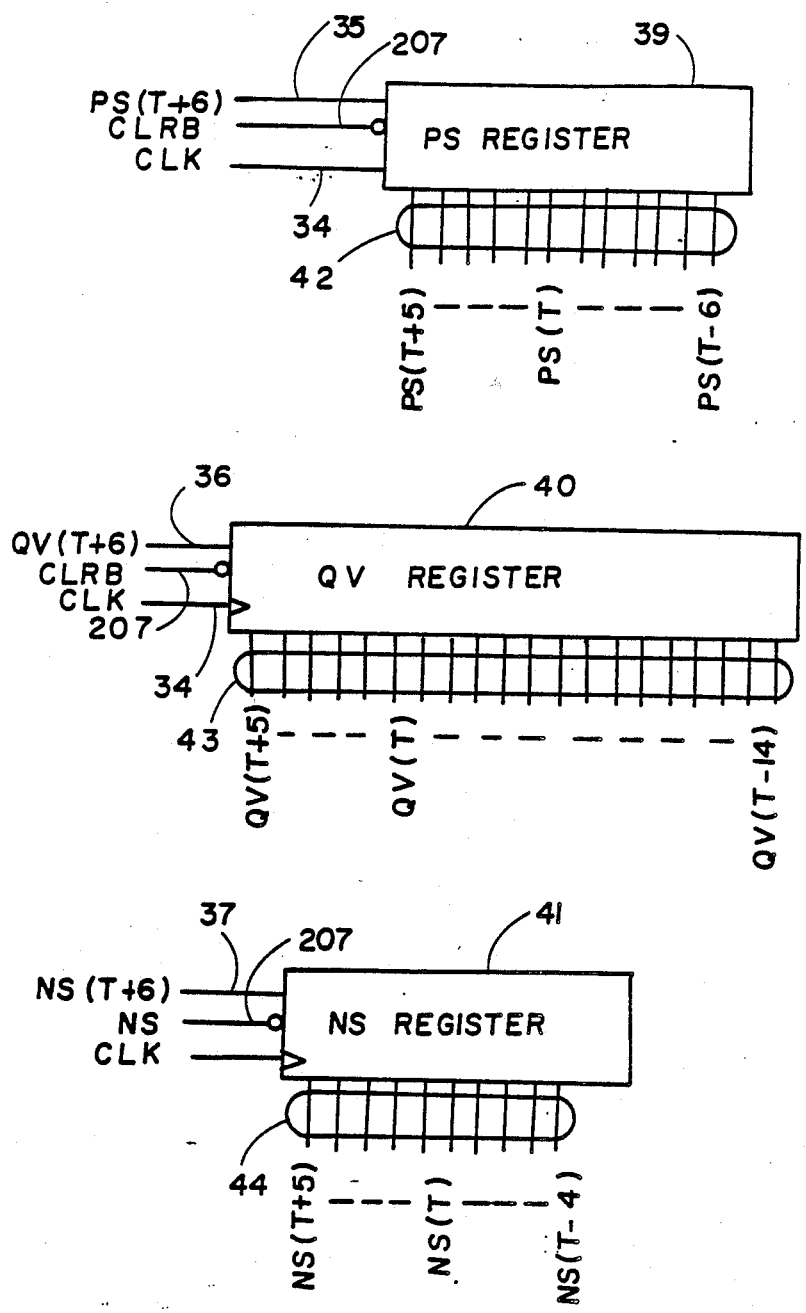
FIGS. 6A, 6B, 6C and 6D are a logic diagram of edge detection logic section 38.
Figure 6B:
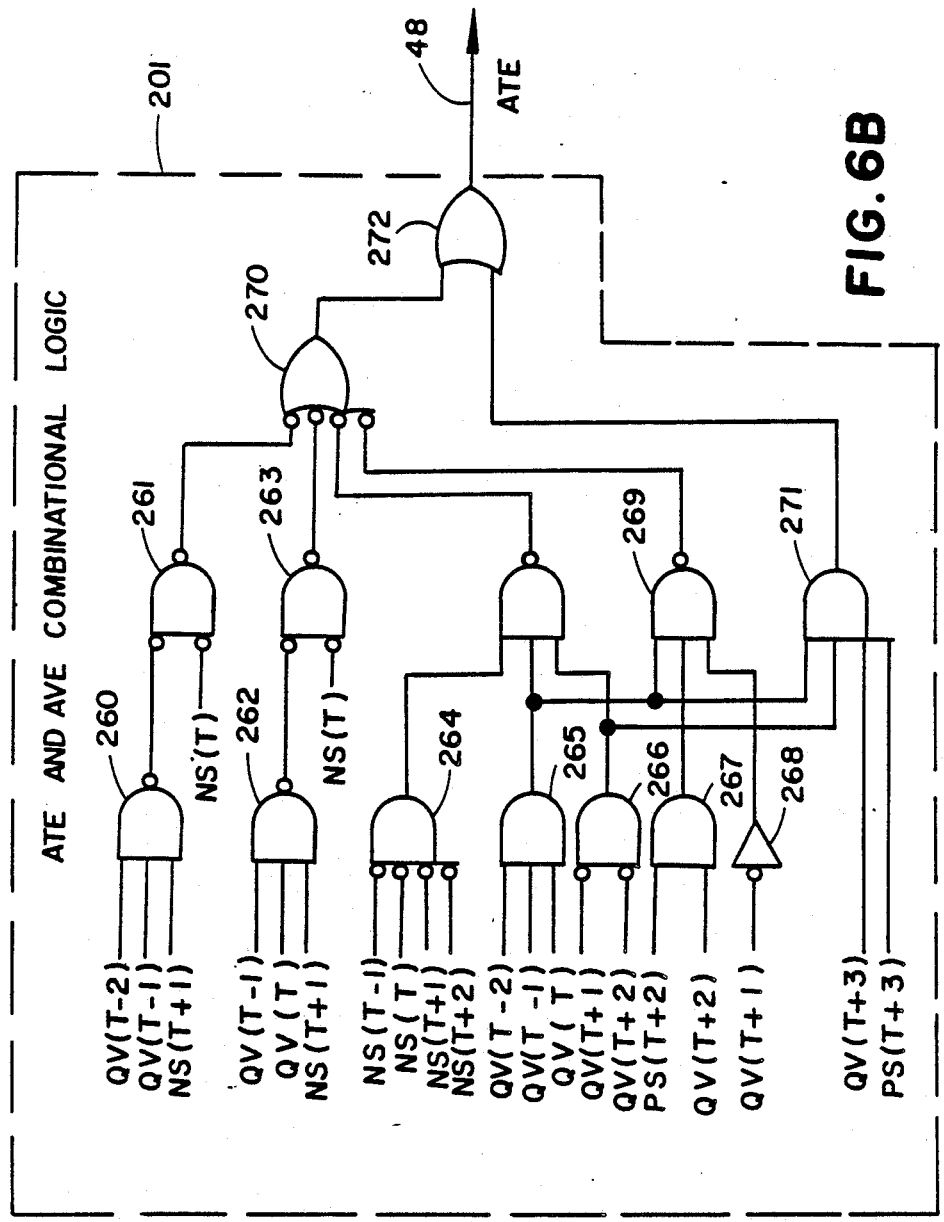
Figure 6C:
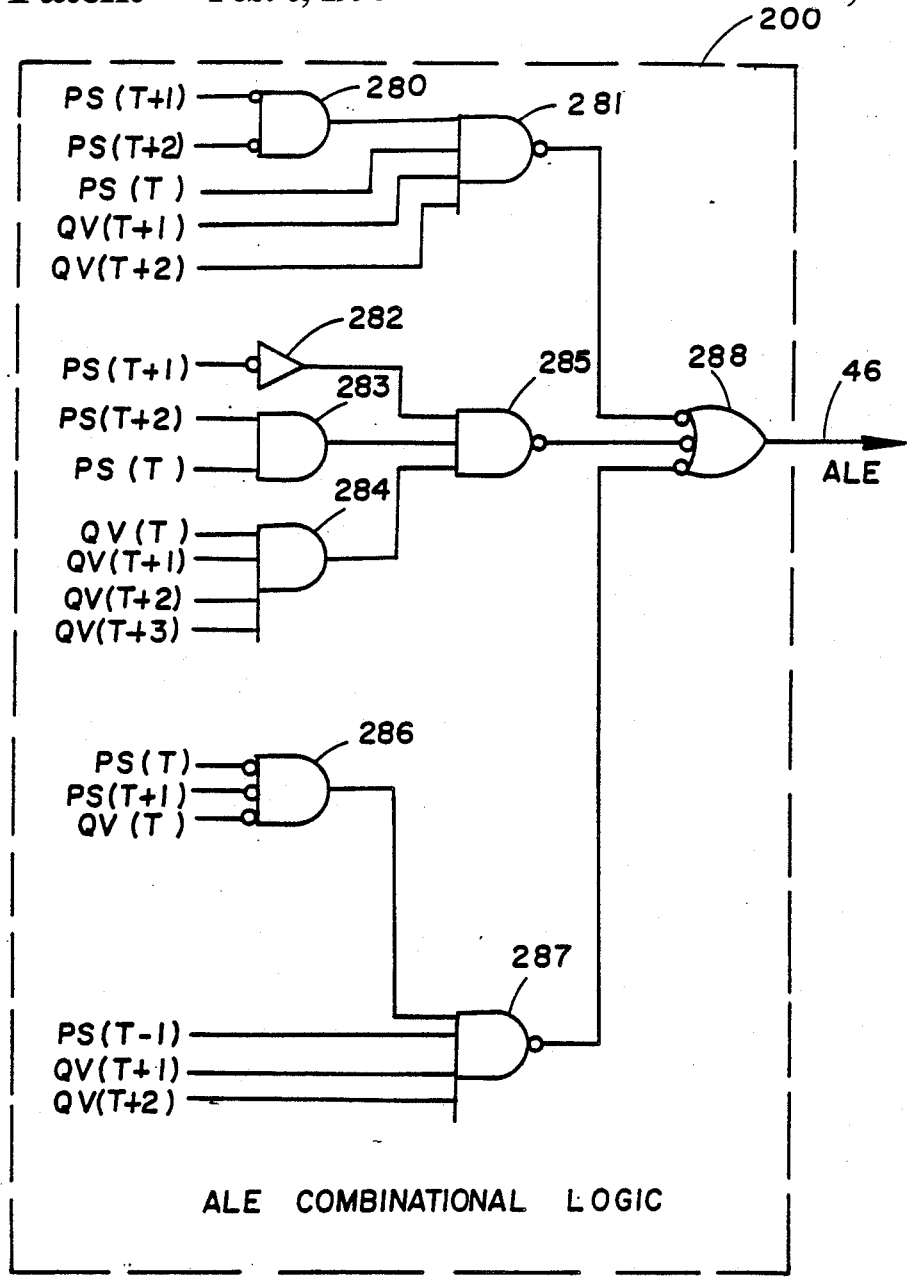
Figure 6D:
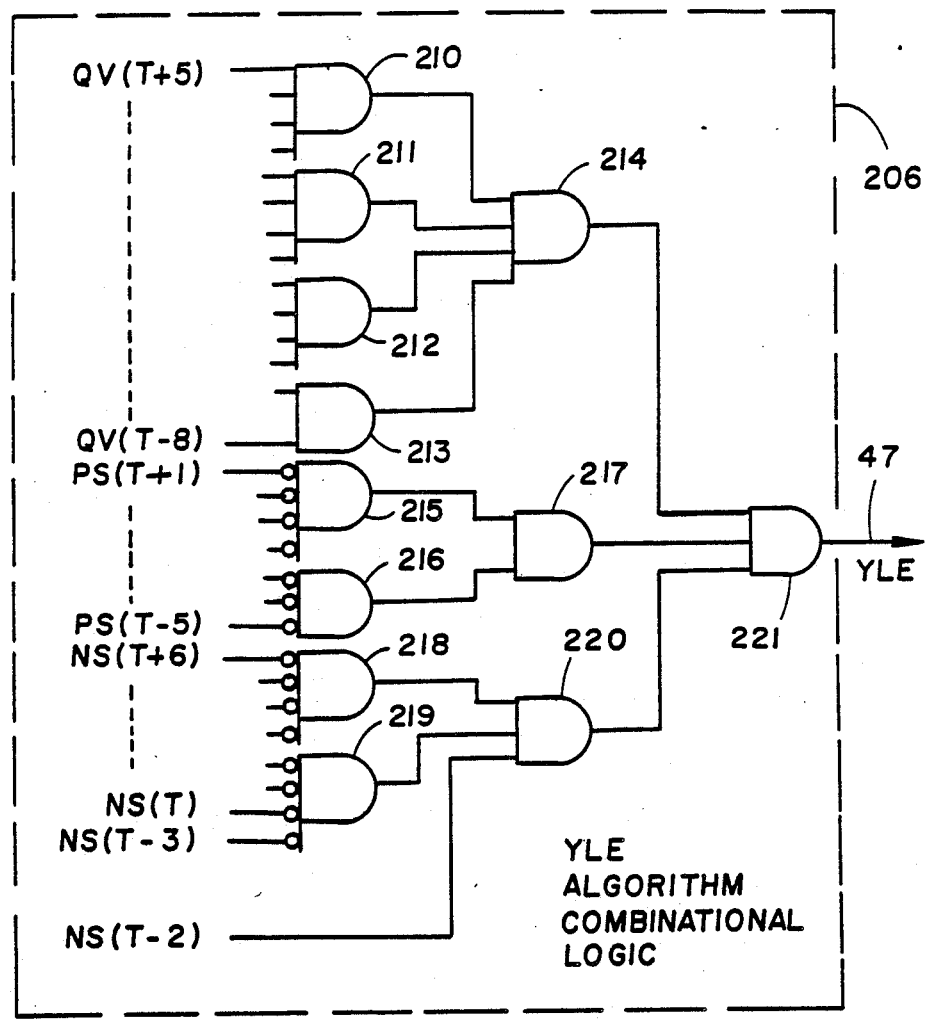
Figure 6E:
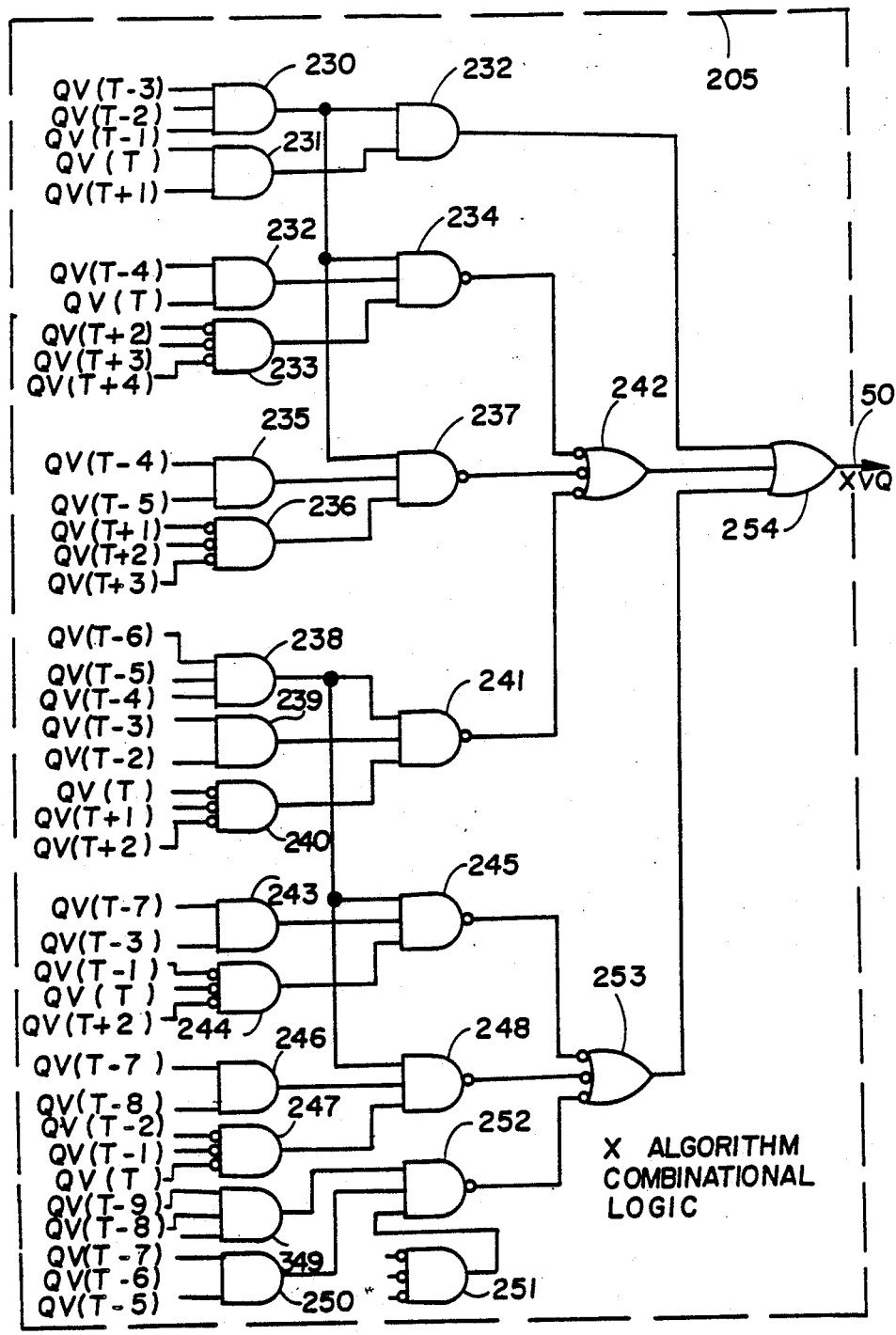
Figure 6F:
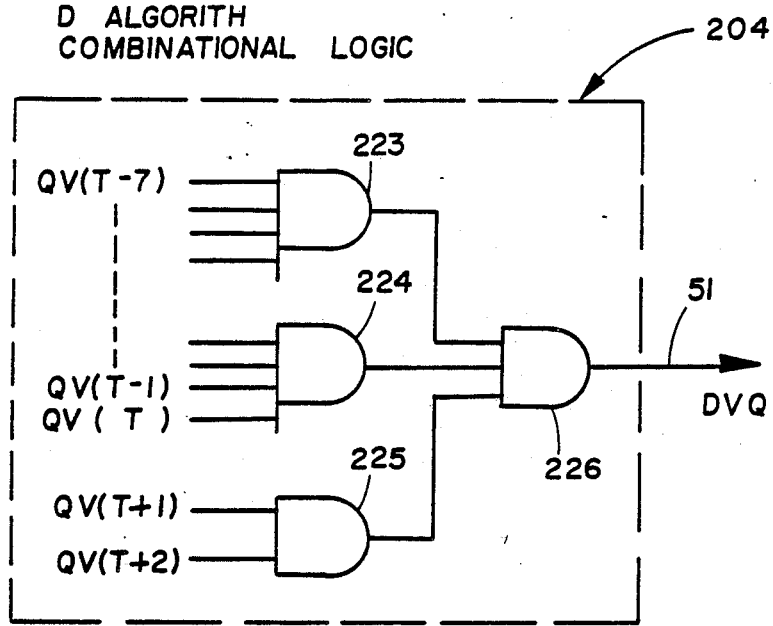
Figure 6F:
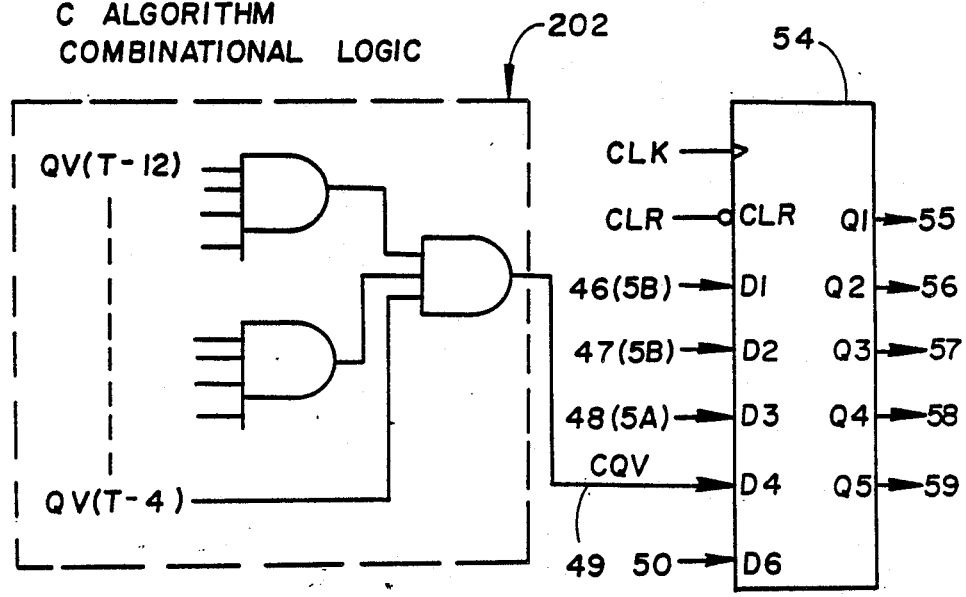

In the timing diagram of FIGS. 7-9, 12, 13 and 15 the leading and trailing edges of the waveforms are shown displaced from the clock pulses. Although the edges of the waveforms are synchronized with the clock pulses, all waveform edges will be delayed from the clock pulse to which the edge is related by the amount of time required for the circuit generating that edge to set-up and stabilize at an output level. The states of the signals which determine the results of a particular logic operation at a particular clock cycle must be the stable signal states existing at the end of the clock cycle immediately preceding the particular clock cycle. Hence the edges of the waveforms in these timing diagrams are shown displaced from the clock pulses. In FIGS. 6A-6C, the combinational logic time-slot references are adjusted by +1 clock pulse to account for the 1 clock period delay in event latch 54.

Figure 7:
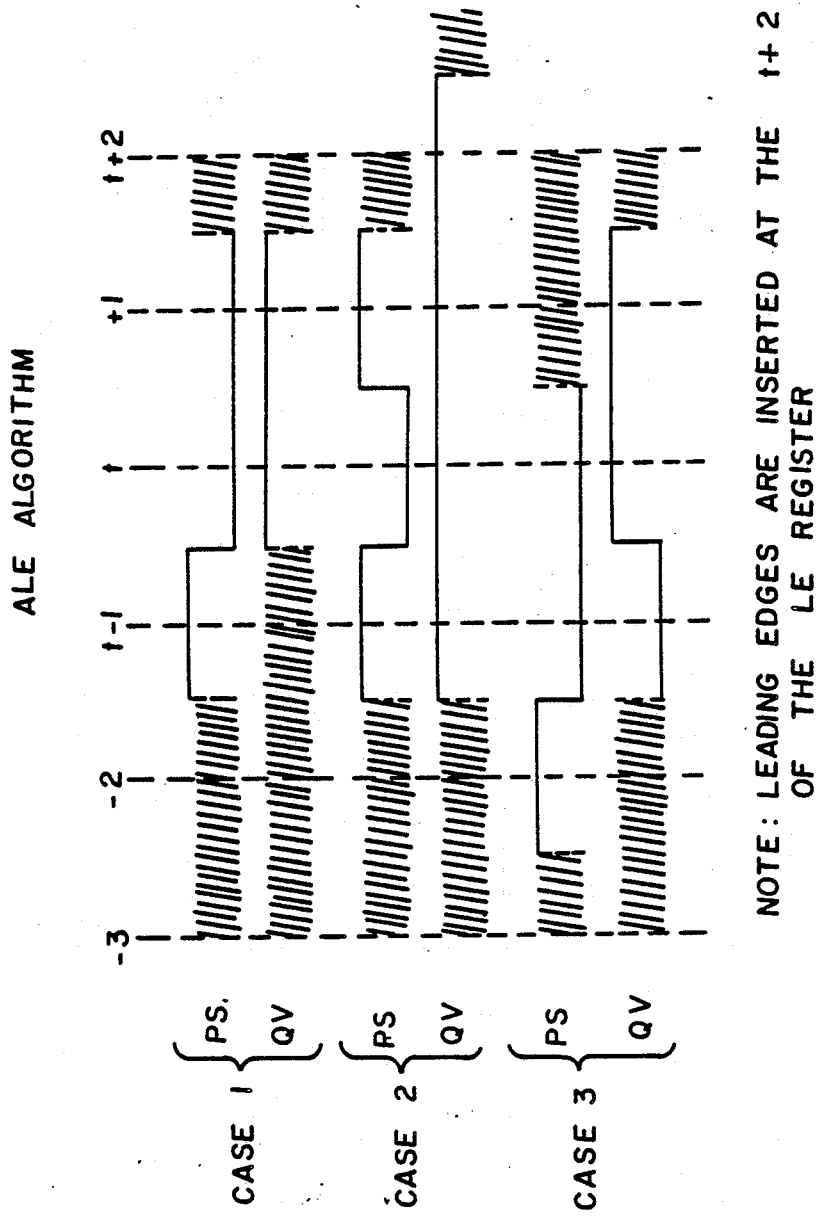
FIG. 7 is a timing diagram of the ALE algorithm which is implemented in circuits shown in FIG. 6.
Figure 8:
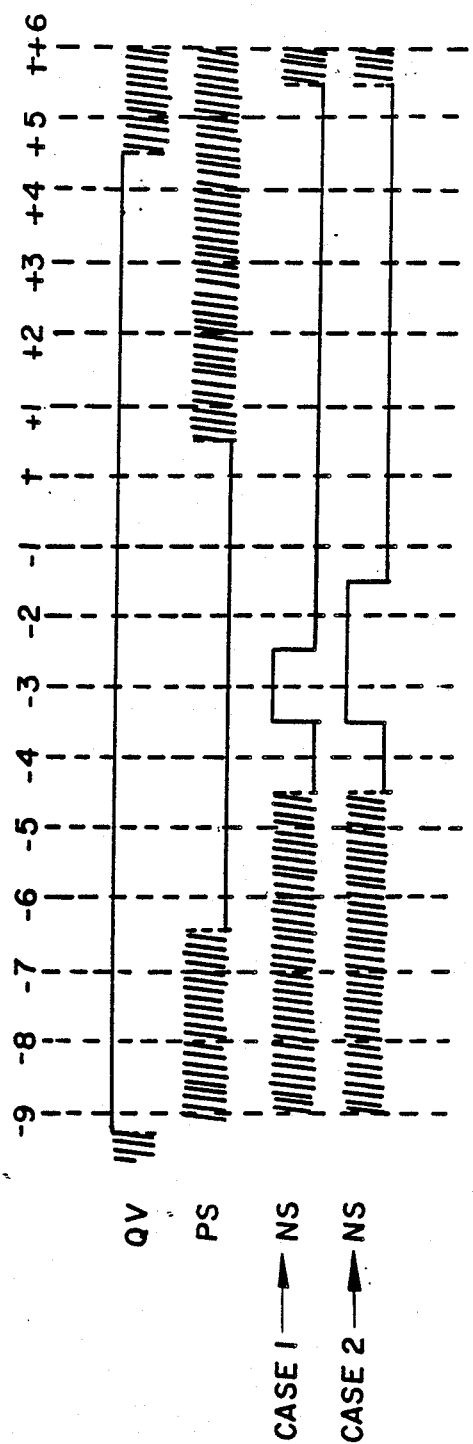
FIG. 8 is a timing diagram of YLE algorithm logic which is implemented in circuits shown in FIG. 6.

ALE algorithm combinational logic 200, which includes cases 2 and 3, not considered in the prior art, detects actual leading edges from the various taps of PS register 39 and QV register 40. Basically, logic section 200 looks for high-to-low transition of PS when QV has been high for two clock pulses or more. The three signal event cases covered by this algorithm are shown in FIG. 7 and are stated below:

Case 1: PS has transitioned from high to low, and this transition is followed by QV remaining high for 2 or more clock pulses. These conditions indicate that the video pulse has stopped rising and has crossed the threshold. This is the typical case, and is stated identically to prior art.

Case 2: When two closely spaced video pulses produce PS pulses such that PS goes low for only one clock pulse between the two pulses. To determine whether the first transition is an actual pulse, the ALE algorithm requires QV to have been high prior to the first low-going PS transition. This prerequisite will eliminate most noise because it is very unlikely that a noise spike would cross and stay above the QV threshold so soon after having generated a PS pulse.

Case 3: This case occurs when the raw video pulse amplitude barely exceeds QV threshold, so that PS transitions from high to low one clock period before QV goes high, but QV then goes high and remains high for 2 or more clocks.

The ALE algorithm is stated below. Notice that all algorithms stated herein are in BASIC program statements rather than Boolean equations. The "&" at the end of each line merely indicates "to be continued on the next line."

```
IF  (PS(T−1)=1 AND PS(T)=0 &
    AND ((PS(T+1)=0 AND QV(T)=1 AND QV(T+1)=1) &
    OR (PS(T+1)=1 AND QV(T−1)=1 AND QV(T)=1 &
    AND QV(T+1)=1 AND QV(T+2)=1))) &
    OR (PS(T−2)=1 AND PS(T−1)=0 AND PS(T)=0 &
    AND QV(T−1)=0 AND QV(T)=1 AND QV(T+1)=1)
    THEN
        ALE=1
    ELSE
        ALE=0
    END IF
                              -*-
```

YLE algorithm combinational logic 206 is entirely new over prior art and has been designed to handle cases where two reply pulses overlap such that the second pulse leading edge is not detected. The YLE algorithm will produce an inferred leading edge in such cases by detecting the presence of the falling edge NS signal when preceded by and followed by an extended period of time when QV is high. Functioning of the YLE algorithm will be apparent, to those skilled in the art, from FIG. 6B together with FIG. 8, the YLE algorithm timing diagram, and the YLE algorithm stated below:

```
IF  ( (NS(T−4)=0 AND NS(T−3)=1 AND NS(T−2)=0) &
    OR (NS(T−4)=0 AND NS(T−3)=1 AND NS(T−2)=1) &
    AND NS(T−1)=0 AND NS(T)=0 AND NS(T+1)=0 &
    AND NS(T+2)=0 AND NS(T+3)=0 AND NS(T+4)=0 &
    AND NS(T+5)=0 AND QV(T−9)=1 AND QV(T−8)=1 &
    AND QV(T−7)=1 AND QV(T−6)=1 AND QV(T−5)=1 &
    AND QV(T−4)=1 AND QV(T−3)=1 AND QV(T−2)=1 &
    AND QV(T−1)=1 AND QV(T)=1 AND QV(T+1)=1 &
    AND QV(T+2)=1 AND QV(T+3)=1 AND QV(T+4)=1 &
    AND PS(T−6)=0 AND PS(T−5)=0 AND PS(T−4)=0 &
```

```
     AND PS(T-3)=0 AND PS(T-2)=0 AND PS(T-1)=0 &
     AND PS(T)=0
THEN
     YLE=1
ELSE
     YLE=0
END IF
                          .*.
```

When an Actual Leading Edge or a Y Algorithm Leading Edge is detected, combinational logic circuits and 206, respectively, acting through event latch (FIG. 6C) and OR gate 61 (FIG. 10A) insert a high into the T+2 position, LE(T+2) 62 of the LE register 63A (FIG. 10A). Logic for such insertion at the LE register input 62 is stated as follows:

```
IF       ALE=1 OR YLE=1
THEN
         ALE(T+2)=1        TRUE input to Register 63A
ELSE
         ALE(T+2)=0        FALSE input to Register 63A
END IF
                          .*.
```

Figure 9:
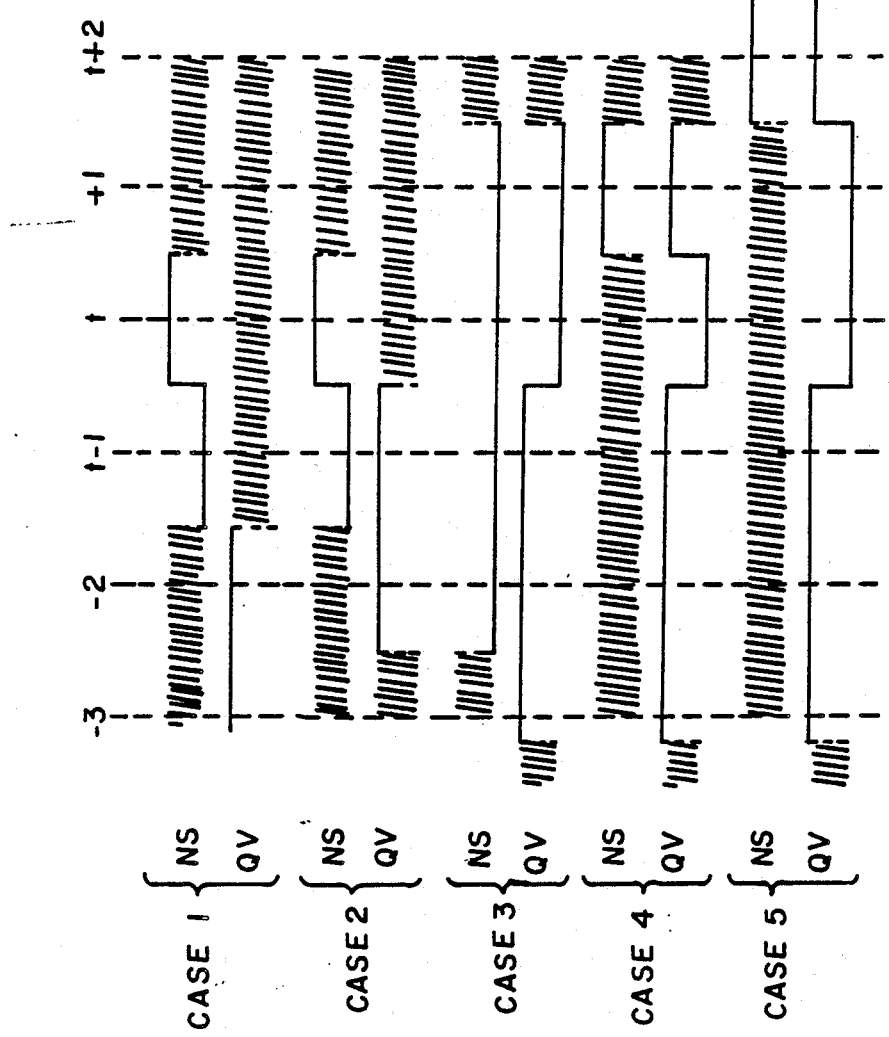
FIG. 9 is a timing diagram of the ATE algorithm logic which is implemented in circuits shown in FIG. 5.

Referring to FIG. 6A, the combinational logic 201 for ATE (Actual Trailing Edge) and AVE algorithms has been revised and improved over prior art to handle the five signal event cases illustrated in FIG. 9 and here stated:

Case 1: When the raw video pulse is weak, it may cross below the QV threshold one clock before NS is generated by the QV trailing edge.

Case 2: Typically, QV terminates near the NS low-to-high transition, indicating that a strong video pulse has occurred.

Case 3: When a video pulse has excessive fall time or pulse droop, it can prevent NS from being generated, even when QV has been high for at least 3 clocks and then return low for at least 2 clocks.

Case 4: QV returns low at the end of the first of two closely spaced pulses, then one clock later, QV goes high at the second pulse leading edge, and PS also goes high, but no NS was generated for the first pulse. This case can occur when the second video pulse is much stronger than the first, so that the rising leading edge of the second video pulse masks the weaker trailing edge of the first video pulse, thereby preventing the generation of an NS pulse.

Case 5: The fifth case occurs when the first of two video pulses is weak or has excessive fall time or pulse droop. In this case, QV returns low for two clocks then returns high coincidentally with PS rise, yet no NS pulse was detected.

Combinational logic 201 examines the NS and QV inputs to detect an Actual Trailing Edge. Combinational logic 201 looks for the low-to-high transition of NS at a time when the presence of a pulse is validated by QV being high for a minimum of two clocks. The ATE algorithm for cases 1& 2, where actual trailing edge is detected, is stated thusly:

```
IF       NS(T-1)=0 AND NS(T)=1 &
         AND ((QV(T-3)=1 AND QV(T-2)=1) &
         OR (QV(T-2)=1 AND QV(T-1)=1))
THEN
         ATE=1
```

```
ELSE
         ATE=0
END IF
                          .*.
```

Where an NS pulse is not detected, combinational logic 201 infers the presence of the Trailing Edge when QV has gone low without an NS transition, a situation which would be indicative of a slowly decaying pulse as in case 3 stated previously with reference to FIG. 9. Combinational logic 201 also detects the condition where QV has gone low but subsequently returns high in the presence of a PS low-to-high transition. This condition is indicative of a video pulse trailing edge having been masked by the leading edge of a subsequent video pulse as in cases 4 and 5 previously stated. The AVE algorithm, which has been designed to produce inferred trailing edges for these signal cases, is stated:

```
IF   QV(T-3)=1 AND QV(T-2)=1 &
     AND QV(T-1)=1 AND QV(T)=0 &
     AND ((NS(T-2)=0 AND NS (T-1)=0 &
     AND NS(T)=0 AND NS(T+1)=0 AND QV(T+1)=0) &
     OR (QV(T+2)=1 AND QV(T+1)=0 AND PS(T+2)=1) &
     OR ((QV(T+1)=1 AND PS(T+1)=1))
THEN
     AVE=1
ELSE
     AVE=0
END IF
                          .*.
```

Whether an actual TE or an inferred TE (inferred by action of AVE algorithm) is detected, a 1-clock high is inserted at T+3 input 57 of the TE register 69A, FIG. 10A (rather than using the T+2 input timing of LE register 63A). The T+3 TE input timing is used to compensate for reduced spacing between the PS trailing edge and the NS leading edge which is intrinsic to the A/D quantizing circuits 12, FIG. 2. This portion of the ATE algorithm, is implemented with OR gates 270 and 272, FIG. 6A, and is stated as follows:

```
IF              ATE=1 OR AVE=1
THEN
                ATE(T+3)=1
ELSE
                ATE(T+3)=0
END IF
                          .*.
```

Referring once again to FIG. 6C, C algorithm combinational logic 202 functions identically to prior art to generate CQV 57. C algorithm is performed when neither a leading or trailing edge occurs within 16 clock pulses after an initial leading or trailing edge, and where the initial leading edge is followed by QV being high for 9 clock pulses. That time is sufficient to assume that two or more overlapping video pulses are present which are so positioned that mutual cancellation of NS and PS has occurred. This time position is assumed to be the correct position of the second video pulse leading edge because: (a) nominal video pulse width is 7 clock periods; and (b) the best estimation of the leading edge position of the second video pulse is that it coincided with the trailing edge of the first video pulse.

Logic 202 (FIG. 6C) determines whether QV has remained high during clock pulses (T−4) through (T−12) by ANDing the outputs of those taps of QV register 40 (FIG. 6A), as will be understood. If all inputs are high, 202 generates CQV=1 on line 49 to event latch 54. CQV is an intermediate logic term used by the C algorithm. C algorithm loads insertion counter 339 (FIG. 10B) with a preset count of nine, as will later be described.

The C algorithm combinational logic including the 1 clock delay of event latch 54 is stated:

```
IF      QV(T−13)=1 AND QV(T−12)=1 AND QV(T−11)=1 &
        AND QV(T−10)=1 AND QV(T−9)=1 AND QV(T−8)=1 &
        AND QV(T−7)=1 AND QV(T−6)=1 AND QV(T−5)=1
THEN
        CQV=1
ELSE
        CQV=0
END IF
                        .*.
```

Note:
CQV is an intermediate logic term used for the C algorithm

D algorithm is performed when a second leading edge occurs from 11 to 16 clock pulses after an initial leading edge and no trailing edge has occurred. D algorithm is based on the assumption that two video pulses overlap so that the initial video pulse trailing edge is masked by the leading edge of the second video pulse. Accordingly, a leading edge is inserted in LE register 63A (FIG. 10A) 7 clock periods after the initial leading edge, provided that a second prerequisite condition is also met: QV must have been high for 10 clock periods after a leading edge at time (T+3). When D algorithm is enabled insertion counter 339 (FIG. 10B) is reset on the next clock pulse, then all subsequent algorithm processing proceeds from this time reference.

The D algorithm combinational logic is stated:

```
IF      QV(T−7)=1 AND QV(T−6)=1 AND QV(T−5)=1 &
        AND QV(T−4)=1 AND QV(T−3)=1 AND QV(T−2)=1 &
        AND QV(T−1)=1 AND QV(T)=1 AND QV(T+1)=1 &
        AND QV(T+2)=1
THEN
        DQV=1
ELSE
        DQV=0
END IF
                        .*.
```

Note:
DQV is an intermediate logic term used for the D algorithm

Combinational logic 204 determines whether QV has remained high for 10 clock periods after a leading edge at time (T+3) by ANDing the outputs of taps (T+2) through (T−7) of LE register 63A. If all inputs to 204 are high, 204 generates DQV=1 on line 51 to the D algorithm insertion logic, FIG. 10B. D algorithm combinational logic 204 functions similarly to prior art to generate DQV 51. Logic implementation for the remainder of D algorithm will be subsequently described with the insertion/deletion logic.

X algorithm combinational logic 205, which generates XQV 50, is entirely new and will be described subsequently with the insertion/deletion logic.

Functioning of new or improved combinational logic sections 201, 204, 205, and 206 will be entirely apparent to those who are skilled in the art. Event latch 54 reclocks and latches the logic signal outputs of the several combinational logic circuits, with the exception of DQV 51.

Figure 10D:
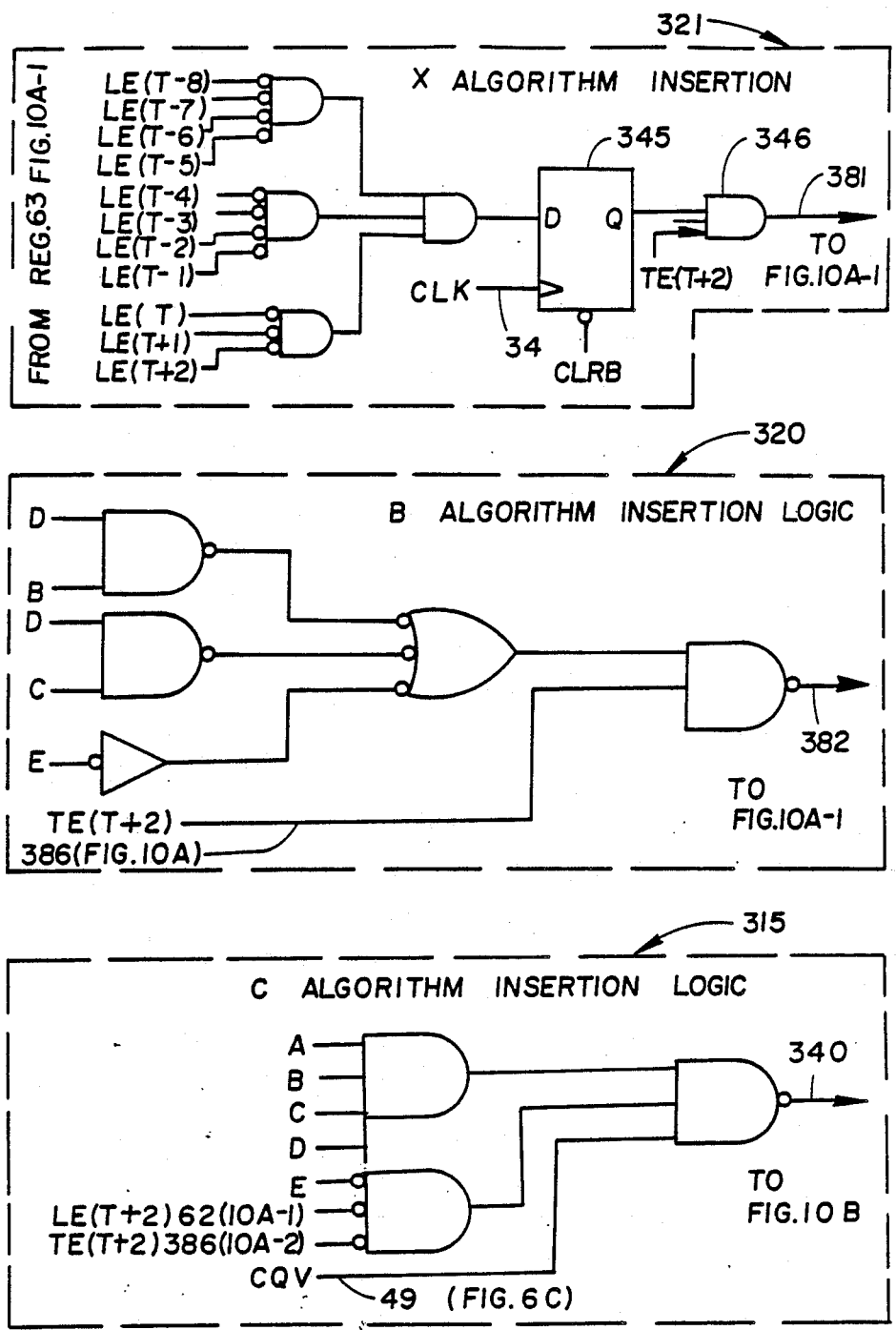

Referring to FIG. 10A, it will be seen that leading edges detected and inferred by the ALE and YLE algorithms are ORed by OR gate 61 and are shifted (at time reference T+2) into LE register 63A, which functions as a digital delay line with a multiplicity of taps. OR gates 304, 305, 306, 307, and 311 allow the several insertion logic circuits shown in FIG. 10B to insert (later in time) leading edges where actual or inferred leading edges were not detected. Referring again to FIG. 10A, AND gates 300–303 are normally enabled to propagate leading edges from stage-to-stage of LE register 63A, but these gates can be jointly inhibited by AALG input 74 from the A algorithm deletion logic 319, FIG. 10C. Again in FIG. 10A, LE register 63B extends the digital delay line to 14-clocks. OR gate 312 allows leading edge insertion by either output 340 of C algorithm insertion logic 315, FIG. 10D or by output 366 of D algorithm insertion logic 322, FIG. 10B.

Referring again to FIG. 10A, TE register 69A and 69B also form a 14-clock delay line for propagation of ATEC (Actual Trailing Edges Clocked) input 57. AND gate 314 is normally enabled to pass actual trailing edges present, but it can be inhibited by AALG input 74.

Included in FIG. 10B, are insertion counter 339, maximum count decoder 316, and in FIG. 10C the state machine logic 80. Insertion counter 339 tracks the relative times of appearance of leading edges, for up to sixteen clock periods, and determines the appropriate times for invoking the B, C and D insertion algorithms for inserting estimated leading and trailing edges. Insertion counter 339 will increment until either a TE appears on line 386, a second LE appears on line 385, or MC (Maximum Count) appears on line 367, then it will be cleared to zero count. Also, when C algorithm makes an insertion, CINS 340 loads a present count of nine into insertion counter 339. State machine logic 80, including logic gates 323 through 331 and master-slave flip-flop 332, monitors MC 367 together with LE register 63A and 63B and TE register 69A and 69B to ascertain bit positions of contents. Outputs $Q_1$ and $Q_2$ of flip-flop 332 can combine in four possible ways to create four unique states S0–S3, defined as follows:

WHEN:
$Q_1 = 0$ AND $Q_2 = 0$, state S0 is defined;
$Q_1 = 1$ AND $Q_2 = 0$, state S1 is defined;
$Q_1 = 0$ AND $Q_2 = 1$, state S2 is defined;
$Q_1 = 1$ AND $Q_2 = 1$, state S3 is defined.

The operation of state machine 80 is summarized in the logic table below and is illustrated graphically in FIG. 11.

STATE MACHINE LOGIC TABLE

| Inputs | | | Present State (@ t) | | Next State (@ t + 1) | Outputs | | Leading Gate 318 |
|---|---|---|---|---|---|---|---|---|
| Max Count | TE | LE | Octal | State | State | $Q^2$ | $Q^1$ | Output |
| 0 | 0 | 0 | 0 | S0 | S0 | 0 | 0 | 1 |
| 0 | 0 | 0 | 0 | S1 | S1 | 0 | 1 | 0 |
| 0 | 0 | 0 | 0 | S2 | S0 | 0 | 0 | 1 |
| 0 | 0 | 0 | 0 | S3 | S1 | 0 | 1 | 0 |
| 0 | 0 | 1 | 1 | S0 | S1 | 0 | 1 | 1 |
| 0 | 0 | 1 | 1 | S1 | S3 | 1 | 1 | 1 |
| 0 | 0 | 1 | 1 | S2 | S0 | 0 | 0 | 1 |
| 0 | 0 | 1 | 1 | S3 | S0 | 0 | 0 | 1 |
| 0 | 1 | 0 | 2 | S0 | S0 | 0 | 0 | 1 |
| 0 | 1 | 0 | 2 | S1 | S0 | 0 | 0 | 1 |
| 0 | 1 | 0 | 2 | S2 | S0 | 0 | 0 | 1 |
| 0 | 1 | 0 | 2 | S3 | S0 | 0 | 0 | 1 |
| 0 | 1 | 1 | 3 | S0 | S0 | 0 | 0 | 1 |
| 0 | 1 | 1 | 3 | S1 | S1 | 0 | 1 | 1 |
| 0 | 1 | 1 | 3 | S2 | S0 | 0 | 0 | 1 |
| 0 | 1 | 1 | 3 | S3 | S0 | 0 | 0 | 1 |
| 1 | 0 | 0 | 4 | S0 | S0 | 0 | 0 | 1 |
| 1 | 0 | 0 | 4 | S1 | S0 | 0 | 0 | 1 |
| 1 | 0 | 0 | 4 | S2 | S0 | 0 | 0 | 1 |
| 1 | 0 | 0 | 4 | S3 | S1 | 0 | 1 | 1 |
| 1 | 0 | 1 | 5 | S0 | S1 | 0 | 1 | 1 |
| 1 | 0 | 1 | 5 | S1 | S1 | 0 | 1 | 1 |
| 1 | 0 | 1 | 5 | S2 | S0 | 0 | 0 | 1 |
| 1 | 0 | 1 | 5 | S3 | S0 | 0 | 0 | 1 |
| 1 | 1 | 0 | 6 | S0 | S0 | 0 | 0 | 1 |
| 1 | 1 | 0 | 6 | S1 | S0 | 0 | 0 | 1 |
| 1 | 1 | 0 | 6 | S2 | S0 | 0 | 0 | 1 |
| 1 | 1 | 0 | 6 | S3 | S0 | 0 | 0 | 1 |
| 1 | 1 | 1 | 7 | S0 | S0 | 0 | 0 | 1 |
| 1 | 1 | 1 | 7 | S1 | S1 | 0 | 1 | 1 |
| 1 | 1 | 1 | 7 | S2 | S0 | 0 | 0 | 1 |
| 1 | 1 | 1 | 7 | S3 | S0 | 0 | 0 | 1 |

In the above table, the first three columns list the possible states of Max Count input 367, TE input 386 and LE input 385 to the state machine. Considering inputs 367, 386 and 385 to comprise a binary number with LE as the least significant bit and Max Count the most significant bit, column four shows the octal equivalent of such binary number. Column five shows each of the four states S0–S3 the machine may be in at any time (t) when the input has the octal value shown to the left in the same row. Column 6 shows that one of the states S0–S3 to which the machine will be driven in the clock cycle (t+1) for each combination of octal input and state S0–S3. Columns 7 and 8 show the $Q_1$ and $Q_2$ output which define that succeeding state shown in column 6. Column 9 shows the output 370 of gate 318 for each combination of Max Count, TE, LE and $Q_1$. Insertion counter 339 is cleared when the output of gate 318 equals zero.

Figure 11:
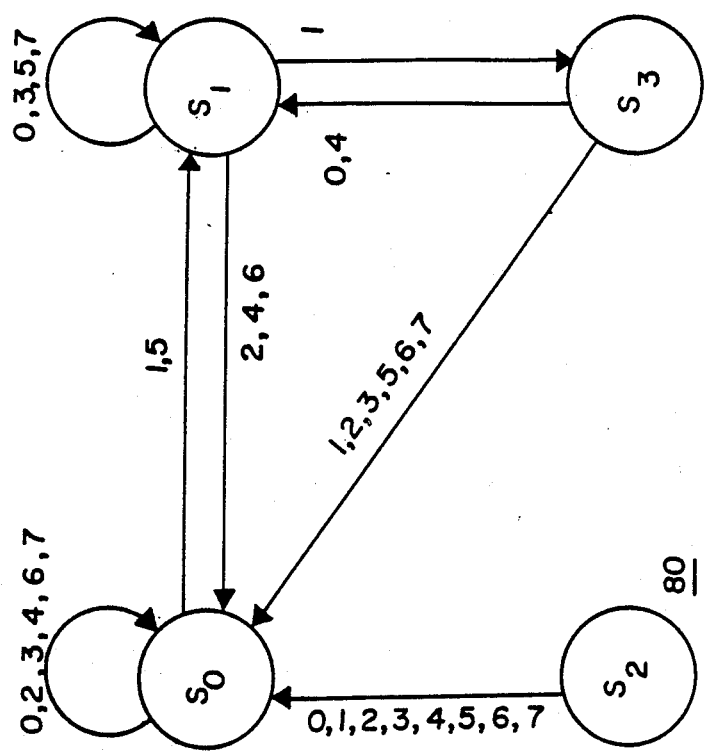
FIG. 11 is a logic state diagram for the state machine logic 80, FIG. 10C.

FIG. 11 is a graphical representation of the information contained in the above State Machine Logic Table. States S0–S3 are shown as four circles. The arrows extending from each of the circles and terminating either on the circle of origin or on a different circle show the state to which the machine will transition when the circle of origin of an arrow is the present state and the octal value of the input to the machine is one of the values shown adjacent the arrow. For example, if the present state is S0 and the octal input is one of the six values adjacent the looped arrow, the machine will remain in the S0 state on the succeeding clock. If the present state is S0 and the octal input is one of the two values adjacent the arrow directed to S1 (i.e. 1 or 5), the machine will transition to state S1 on the succeeding clock.

Insertion counter 339, FIG. 10B, keeps track of spacing between an initial LE and any subsequent LEs or TEs for invoking B, C, and D algorithm insertion. When an initial LE is detected, state machine logic 80 does not remove the CLR 370 until the next following clock pulse. Counter 339 begins incrementing on the second clock after the initial LE. Therefore, actual space between the initial LE and any subsequent LE or TE is always ICOUNT +1; where ICOUNT is the output count at the time of the initial LE.

Various ones of the multiplicity of taps of registers 63A, 63B and 69A, 69B, FIG. 10A, are input to the several insertion/deletion logic circuits shown schematically in FIGS. 10 B and 10C. A algorithm deletion logic 319 will be functionally described after the insertion logic circuits have been described. B algorithm insertion logic 320 and C algorithm insertion logic 315 are identical to prior art and are shown in FIG. 10D. A brief functional description of these two logic circuits follows:

B algorithm functions in the case of overlapping pulses. B algorithm insertion logic 320 examines separation between actual leading and trailing edges to determine whether an LE should be inserted. If separation is between 11 and 18 clocks, an LE is inserted 7 clocks ahead of the ATE position.

Figure 12:
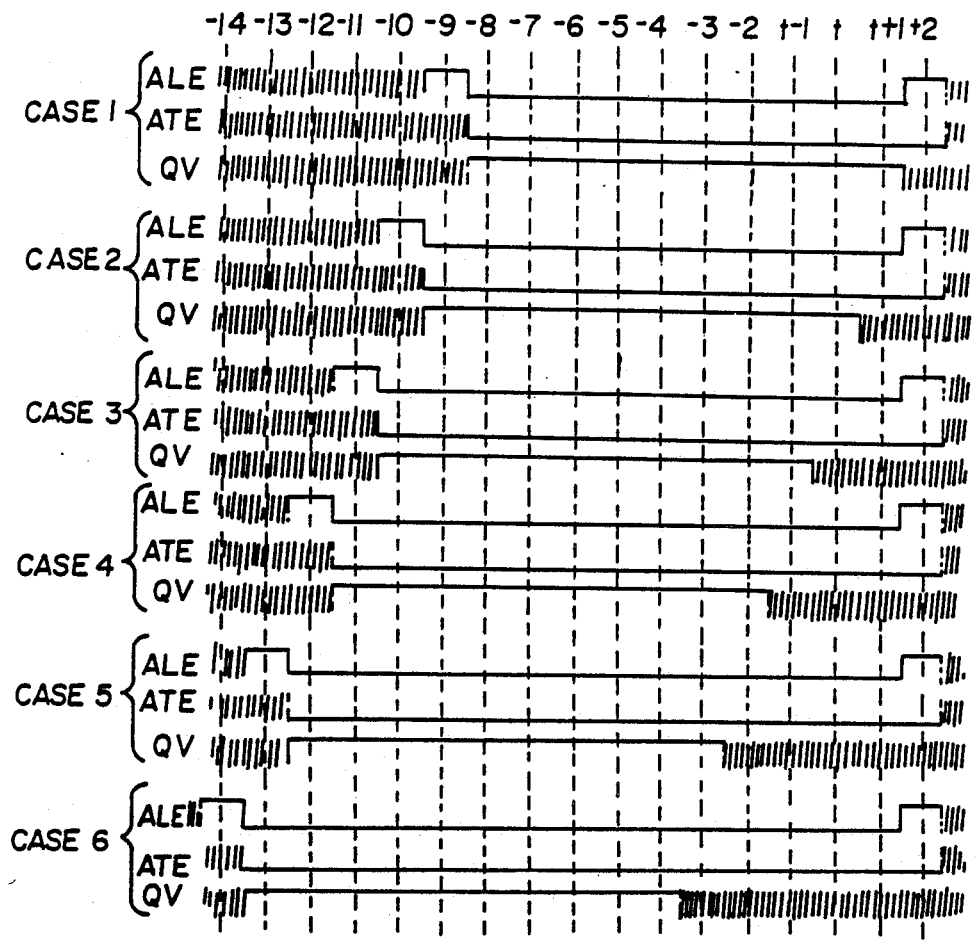
FIG. 12 is a timing diagram of D algorithm insertion logic 322, FIG. 10B.

D algorithm insertion logic 322 (FIG. 10B) includes a 6-stage shift register 347 which receives DQV 51 from combinational logic 204 (FIG. 6C) and provides the six delayed derivations, DQV1 through DQV6, of that input for execution of the D algorithm. Timing for the six cases of the D algorithm is shown in FIG. 12. When D algorithm is enabled, insertion counter 339, FIG. 10B, is being loaded by CINSB 340 so that it will begin counting on the next following clock. The following table lists LE insertions as a function of the initial LE position in LE Register 63:

| INITIAL LE | INSERTED LE |
|---|---|
| T−9 | T−2 |
| T−10 | T−3 |
| T−11 | T−4 |
| T−12 | T−5 |
| T−13 | T−6 |
| T−14 | T−7 |

The D algorithm with its six cases is stated as follows:

IF    QV(T−7)=1 AND QV(T−6)=1 AND QV(T−5)=1 &
AND QV(T−4)=1 AND QV(T−3)=1 AND QV(T−2)=1 &

```
                AND QV(T-1)=1 AND QV(T)=1 AND QV(T+1)=1 &
                AND QV(T+2)=1
THEN
                DQV(T)=1
ELSE
                DQV(T)=0
END IF
IF              ALE(T+2)=1 AND ICOUNT=10 AND DQV(T-1)=1
THEN
                DINS1=1
ELSE
                DINS1=0
END IF
IF              ALE(T+2)=1 AND ICOUNT=11 DQV(T-2)=1
THEN
                DINS2=1
ELSE
                DINS2=0
END IF
IF              ALE(T+2)=1 AND ICOUNT=12 AND DQV(T-3)=1
THEN
                DINS3=1
ELSE
                DINS3=0
END IF
IF              ALE(T+2)=1 AND ICOUNT=13 AND DQV(T-4)=1
THEN
                DINS4=
                DINS4=
ELSE
DINS4=0
END IF
IF              ALE(T+2)=1 AND ICOUNT=14 AND DQV(T-5)=1
THEN
                DINS5=1
ELSE
                DINS5=0
END IF
IF              ALE(T+2)=1 AND ICOUNT=15 AND DQV(T-6)=1
THEN
                DINS6=1
ELSE
                DINS6=0
END IF
IF              DINS1=1 OR DINS2=1 OR DINS3=1 OR DINS4=1 OR
                DINS5=1 & OR DINS6=1
THEN
                DLE=1
ELSE
                DLE=0
END IF
```

Note:
DQV is an intermediate logic term used for the D algorithm.

Figure 13:
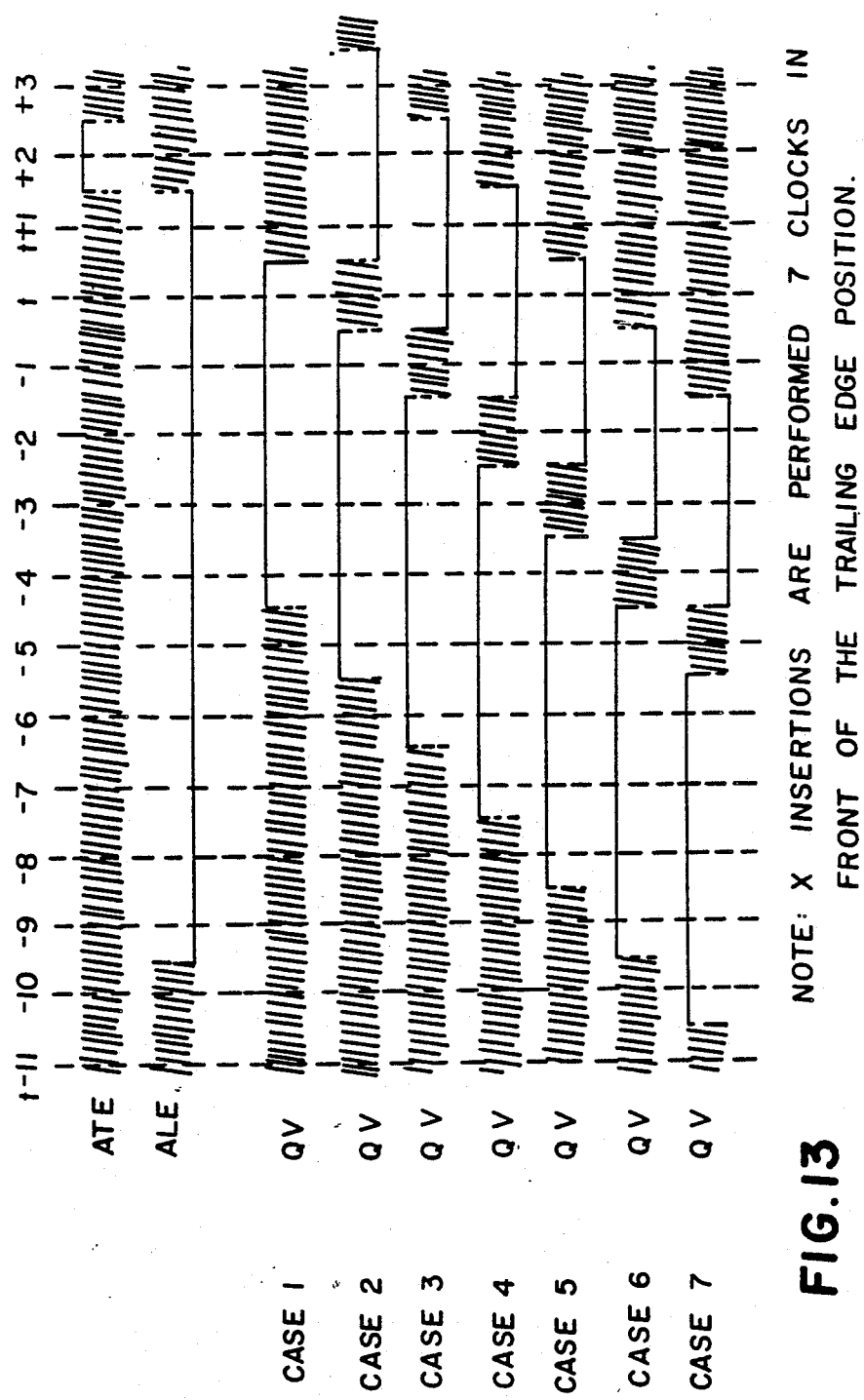
FIG. 13 is a timing diagram of X algorithm insertion logic 321, FIG. 10C.

The X algorithm is entirely new over prior art and was added to detect absence of a preceding LE when a TE has been detected as shown in FIG. 13. The X Algorithm inserts an LE seven clocks ahead of a TE, when QV is high for five consecutive clocks without a previous LE in LE register 63A, FIG. 9A. X algorithm is stated as follows:

```
IF              ATE(T+2)=1 &
                AND ALE(T-9)=0 &
                AND ALE(T-8)=0 &
                AND ALE(T-7)=0 &
                AND ALE(T-6)=0 &
                AND ALE(T-5)=0 &
                AND ALE(T-4)=0 &
                AND ALE(T-3)=0 &
                AND ALE(T-2)=0 &
                AND ALE(T-1)=0 &
                AND ALE(T)=0 &
                AND ALE(T+1)=0 &
                AND ((QV(T-4)=1 AND QV(T-3)=1 AND QV(T-2)=1 &
                AND QV(T-1)=1 AND QV(T)=1) &
                OR (QV(T-6)=1 AND QV (T-5)=1 AND QV(T-4)=1 &
                AND QV(T-3)=1 AND QV(T-2)=1 AND QV(T)=0 &
                AND QV(T+1)=0 AND QV(T+2)=0) &
                OR (QV(T-8)=1 AND QV(T-7)=1 AND QV(T-6)=1 &
                AND QV(T-5)=1 AND QV(T-4)=1 AND QV(T-2)=0 &
                AND QV(T-1)=0 AND QV(T)=0) &
```

```
                OR (QV(T-10)=1 AND QV(T-9)=1 AND QV(T-8)=1 &
                AND QV(T-7)=1 AND QV(T-6)=1 AND QV(T-4)=0 &
                AND QV(T-3)=0 AND QV(T-2)=0) &
                OR (QV(T-5)=1 AND QV(T-4)=1 AND QV(T-3)=1 &
                AND QV(T-2)=1 AND QV(T-1)=1 AND QV(T+1)=0 &
                AND QV(T+2)=0 AND QV(T+3)=0) &
                OR (QV(T-7)=1 AND QV(T-6)=1 AND QV(T-5)=1 &
                AND QV(T-4)=1 AND QV(T-3)=1 AND QV(T-1)=0 &
                AND QV(T)=0 AND QV(T+1)=0) &
                OR (QV(T-9)=1 AND QV(T-8)=1 AND QV(T-7)=1 &
                AND QV(T-6)=1 AND QV(T-5)=1 AND QV(T-3)=0 &
                AND QV(T-2)=0 AND QV(T-1)=0))
THEN
                XLE=1
ELSE
                XLE=0
END IF
```

Figure 14:
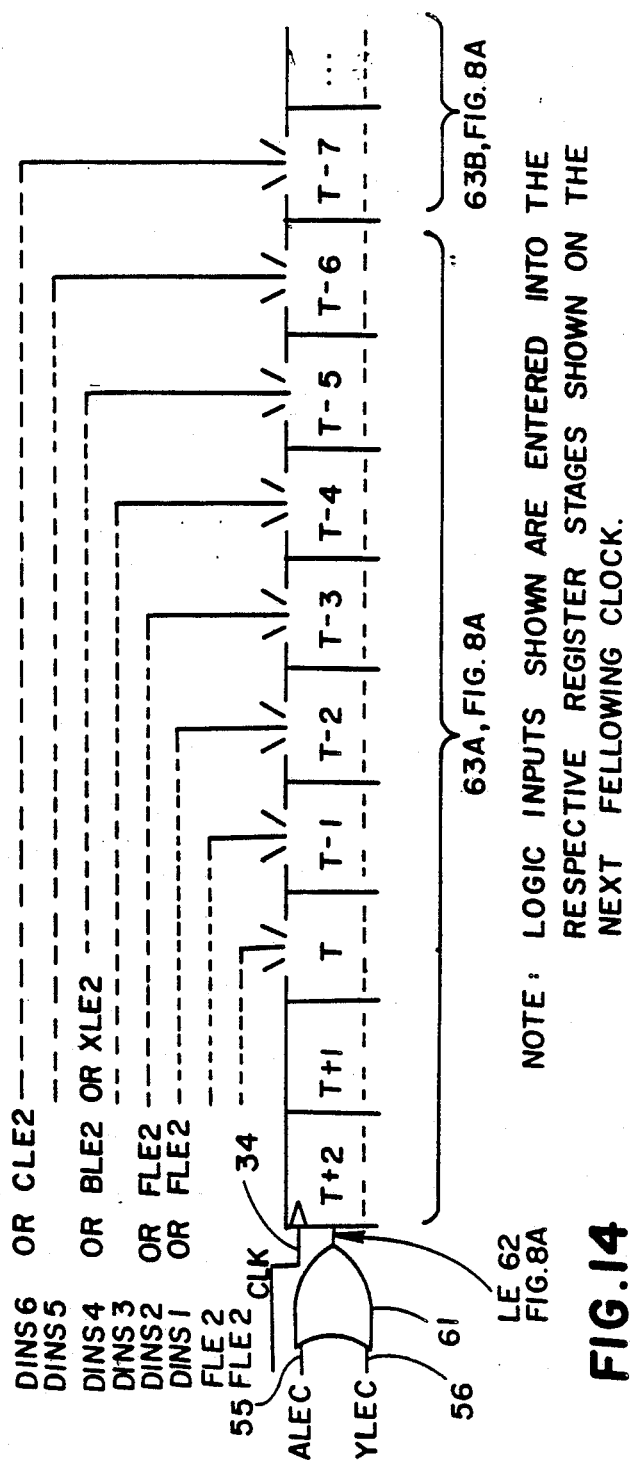
FIG. 14 is a logic diagram of LE register 63A in FIG. 10A, showing insertion and deletion positions for the several algorithms.
Figure 15:
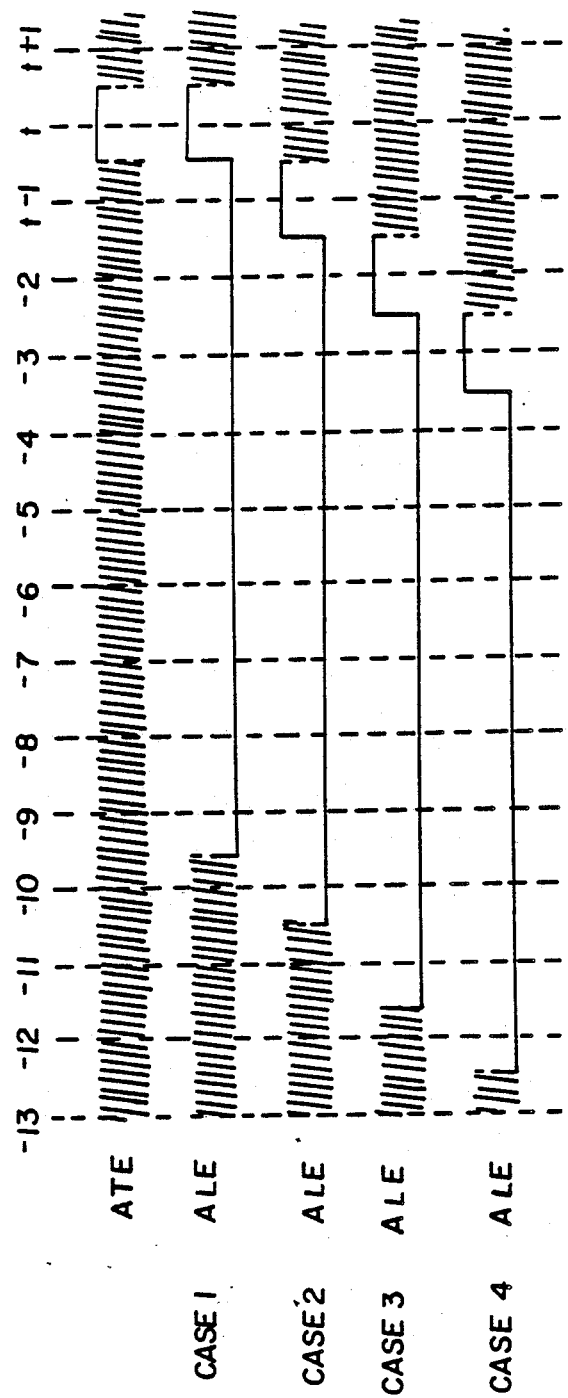
FIG. 15 is a timing diagram of A algorithm deletion logic 319, FIG. 10C.

Once the LE register 63A and 63B, FIG. 9A, and TE register 69A and 69B have been loaded with information based on the detection of the actual and inferred leading and trailing edges, the several insertion logic circuits determine correct LE positions to be inserted into the LE register 63A and 63B. Actual and inferred leading edges are entered at the t+2 position of the LE register as shown in FIG. 14. Insertions performed by the insertion logic circuits 315 and 320 (FIG. 10D), 321 (FIG. 10C) and 322 (FIG. 10B) are entered at positions T through T−7. Of course, data is actually entered into the respective register states on the next rising clock edge.

The contents of LE register 63A, including any insertions, are then examined by A algorithm deletion logic 319 (FIG. 10C) which functions as a narrow-pulse discriminator to eliminate actual LE-TE pairs which are too close together. Any LE-TE pair with separation of 3 clocks or less (nominal separation is 7 clocks) will be deleted unless either:
a. Trailing edge can be paired with a leading edge which is 4 to 9 clocks earlier; or
b. Leading edge was used to perform a D algorithm insertion of an estimated leading edge.

The deletion algorithm is stated:

LE pulses in the output datastream. In the quiescent condition, flip-flop 407 QB output 413 is high, so that AND gate 403 is enabled. When an output is present at 402, it passes AND gate 403 and preset Q output 406 flip-flop 405 high. Two CLK 34 cycles later, CLKD2 414 will clock flip-flop 407 on to produce an active bit in output data stream 408. At the same time, QB output 413 goes low to inhibit AND gate 403 and to clear flip-flop 405 through OR gate 416. The next CLKD2 414 rising edge will clock output 408 of flip-flop 407 low to terminate the active output bit and to once again enable AND gate 403. This scheme ensures that active LE bits in the output stream will be separated by at least one CLKD2 period, and that all output bits will be one CLKD2 period in width. This feature aids the associated Reply Decoder in separating and declaring overlapping or closely spaced replies.

Interrogation pulses as well as reply pulses can be present at output 408, depending upon system application. Conventional mode-decode circuit 409 uses this output to identify interrogation mode, and it then produces a MDEC output 410 (Mode Decode Complete) which enables AND gate 411 to pass SLE 412 (Sum Leading Edge) datastream, which contains reply pulse LEs only, to the Reply Decoder.

```
IF      TE(T)=1 AND [LE(T-9)=0 AND LE(T-8)=0 AND &
        LE(T-7)=0 AND LE(T-6)=0 LE(T-5)=0 AND &
        LE(T-4)=0 AND LE(T-3)=0 AND LE(T-2)=0 AND &
        LE(T-1)=0 AND LE(T)=1] &
        OR [LE(T-10)=0 AND LE(T-9)=0 AND LE(T-8)=0 &
        AND LE(T-7)=0 AND LE(T-6)=0 LE(T-5)=0 AND &
        LE(T-4)=0 AND LE(T=3)=0 AND LE(T-2)=0 AND &
        LE(T-1)=1] OR [LE(T-11)=0 AND LE(T-10)=0 &
        AND LE(T-9)=0 AND LE(T-8)=0 & AND LE(T-7)=0 &
        LE(T-6)=0 LE(T-5)=0 AND LE(T-4)=0 AND &
        LE(T-3)=0 &
        AND LE(T-2)=1] &
        OR [LE(T-12)=0 AND LE(T-11)=0 AND &
        LE(T-10)=0 LE(T-9)=0 AND LE(T-8)=0 AND &
        LE(T-7)=0 AND LE(T-6)=0 LE(T-5)=0 &
        LE(T-4)=0 AND LE(T-3)=1]
THEN
        AALG = 1
ELSE
        AALG = 0
```

Figure 16:
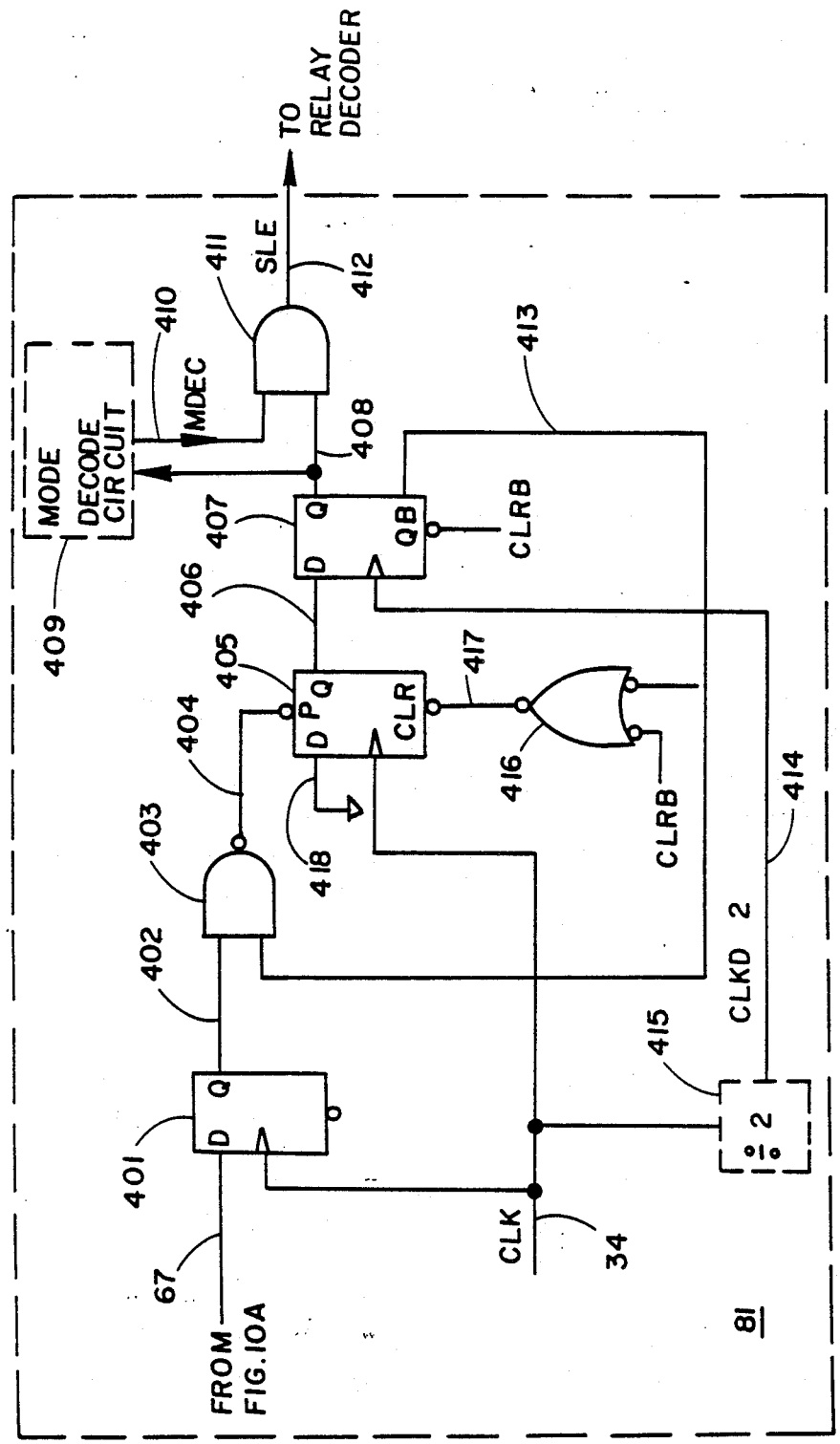
FIG. 16 is a logic diagram of the output logic section 81, FIG. 2B.

Referring to FIG. 16A, it will be seen that output 67 (FIG. 10A) is shifted into latch 401 in the output logic 81 by system clock 34. Divider 415 provides a half-frequency clock CLKD2 414, which resynchronizes the datastream output 412 of logic 81. AND gate 403, D-type flip-flops 405 and 407, and OR gate 416 perform this resynchronization process and preclude adjacent Although not shown in this preferred embodiment, the output logic circuit also processes QV and TE signals, but they are not needed or used by the associated Reply Decoders known to be used in existing applications. Other possible variations to the preferred embodiment will be obvious to those skilled in the art.

WHAT IS CLAIMED IS:

1. In a pulse code communications system having a receiver, a video detector producing a composite video signal which may be formed by interfering pulse signals received by said receiver and a leading edge detector/pulse quantizer for processing said composite video signal to separate interfering pulses therein, said leading edge detector including:

a source of clock signals;

means responsive to the amplitude and rate of change of amplitude of said composite video signal to provide:

(a) a positive slope (PS) signal which persists during the time said rate of change of amplitude increases at a predetermined rate;

(b) a negative slope (NS) signal which persists during the time said rate of change of amplitude decreases at a predetermined rate; and (c) a quantized video (QV) signal which persists during the time said amplitude exceeds a predetermined level;

a first shift register for propagating said PS signals according to their relative times of appearance;

a second shift register for propagating said NS signals according to their relative times of appearance;

a third shift register for propagating said QV signals according to their relative times of appearance;

each of said first, second and third registers propagating the signals contained therein at a rate determined by said clock signals;

first logic means for examining the contents of said first and third registers to determine the truth of a condition in which:

said third register contains a signal which has persisted for two or more clock signals after the appearance of a first signal in said first register; and for inserting a signal in said first register at a position two clock signals after said first signal therein if said condition is true;

second logic means for examining the contents of said first and second registers to determine the truth of a condition in which:

a signal is present in said second register at a position of between 11 and 18 clock signals after a first signal appears in said first register and no second signal is present in said first register in said 11-18 clock signal interval; and for inserting a second signal in said first register at a position corresponding to a time of 7 clock signals before the time of appearance of said signal in said second register; and means for unloading the contents of said first register in serial-by-bit format after operation of said first and second logic means:

the improvement wherein said first logic means further includes:

means for determining the truth of a second condition in which:

a first and second signal are present in said first register separated by one clock signal interval and said third register contains a signal at the time said first signal of said first register ends; and means for deleting said second signal from said first register if said second condition is not true.

2. The improvement of claim 1 wherein said source of clock signals generates clock signals at a frequency of substantially 16 MHz and further including:

means included in said first logic means for determining the truth of a third condition in which:

a first signal is present in said first register and no signal is present in said third register at a time corresponding to the time of said first signal in said first register, but a signal does appear in said third register within a time of two clock signals after the end of said first signal in said first register; and means for deleting said first signal from said first register if said third condition is not true.

3. The improvement of claim 2 further including:

third logic means for examining the contents of said first, second and third registers during first, second and third intervals, respectively, said first interval extending through a time corresponding to six clock signals prior to a reference clock signal until said reference clock signal, said second interval extending from a time beginning just before four clock signals prior to said reference clock signal and ending at a time just after one clock signal prior to said reference clock signal, said third interval extending from a time beginning just before nine clock signals prior to said reference clock signal and ending just after four clock signals after said reference clock signal, and for determining the truth of a condition in which:

no signal is present in said first register during said first interval and a signal is present in said second register during said second interval and a signal is present in said third register during said entire third interval; and means for inserting a signal in said first register at a time corresponding to two clock signals after said reference clock signal if said condition of said third logic means is true.

4. The improvement of claim 3 further including:

fourth logic means for examining the contents of said first, second and third registers during fourth, fifth and sixth intervals, respectively, said fourth interval extending from a time corresponding to nine clock signals prior to a reference clock signal until one clock signal after said reference clock signal, said fifth interval extending from a time just prior to the second clock signal after said reference clock signal until a time just after said second clock signal, said sixth interval extending from a time just prior to the fourth clock signal before said reference clock signal until a time just after said reference clock signal;

and for determining the truth of a first condition in which:

no signal is present in said first register during said fourth interval and a signal is present in said second register during said fifth interval and a signal is present in said third register during said sixth interval; and means for inserting a signal in said first register at a time corresponding to five clock signals prior to said reference clock signal if said condition of said fourth logic means is true.

5. The improvement of claim 4 wherein said fourth logic means further includes:

means for examining the contents of said third register during seventh and eighth intervals, said seventh interval extending from a time just prior to the fifth clock signal before said reference clock signal until a time just after the first clock signal before said reference clock signal, said eighth interval extending from a time just prior to the first clock signal after said reference clock signal until a time just after the third clock signal after said reference clock signal, and wherein said means of said third logic means for determining the truth of a condition further includes means for determining the truth of a second condition in which:

no signal is present in said first register during said fourth interval and a signal is present in said second register during said fifth interval and a signal is present in said third register during said seventh interval and no signal is present in said third register during said eighth interval; and means for inserting a signal in said first register at a time corresponding to five clock signals prior to said reference clock signal if said second condition of said fourth logic means is true.

6. The improvement of claim 5 wherein:

said seventh interval extends from a time just prior to the sixth clock signal before said reference clock signal until a time just after the second clock signal before said reference clock signal; and said eighth interval extends from a time just before said reference clock signal until a time just after the second clock signal after said reference clock signal.

7. The improvement of claim 5 wherein:

said seventh interval extends from a time just prior to the seventh clock signal before said reference clock signal until a time just after the third clock signal before said reference clock signal; and said eighth interval extends from a time just before the first clock signal before said reference clock signal until a time just after the first clock signal after said reference clock signal.

8. The improvement of claim 5 wherein:

said seventh interval extends from a time just prior to the eighth clock signal before said reference clock signal until a time just after the fourth clock signal before said reference clock signal; and said eighth interval extends from a time just before the second clock signal before said reference clock signal until a time just after said reference clock signal.

9. The improvement of claim 5 wherein:

said seventh interval extends from a time just prior to the ninth clock signal before said reference clock signal until a time just after the fifth clock signal before the said reference clock signal; and said eighth interval extends from a time just before the third clock signal before said reference clock signal until a time just after the first clock signal before said reference clock signal.

10. The improvement of claim 5 wherein:

said seventh interval extends from a time just prior to the tenth clock signal before said reference clock signal until a time just after the sixth clock signal before the said reference clock signal; and said eighth interval extends from a time just before the fourth clock signal before said reference clock signal until a time just after the second clock signal before said reference clock signal.

11. The improvement of claim 5 further including:

an insertion counter for determining the times of operation of said second, third and fourth logic means;

fifth logic means providing an output for resetting and preloading said counter; and a state machine providing an output for enabling said fifth logic means;

said counter accumulating a count of said clock signals after being reset or preloaded and providing output signals indicative of said accumulated count, said fifth logic means including a decoder receiving said output signals of said counter for generating a maximum count signal when the accumulated count of said counter reaches a predetermined value, and receiving a first input from said first register at a time corresponding to two clock signals after said reference clock signal, and receiving a second input from said second register at a time corresponding to two clock signals after said reference clock signal, said state machine including a first flip-flop, a second flip-flop and internal logic means, said state machine internal logic means receiving:

a first input indicating the presence of a signal in said first register at a time corresponding to two clock signals after said reference clock signal, a second input indicating the presence of a signal in said second register at a time corresponding to two clock signals after said reference clock signal, a third input indicating the presence of said maximum count signal from said counter, a fourth input comprised by a feedback signal from the output of said first flip-flop, and fifth, sixth and seventh inputs comprised by feedback signals from the output of said second flip-flop, said state machine logic examining the states of said input signals thereto at times corresponding to each clock signal to determine the state into which the output of said first flip-flop will be driven upon the appearance of the clock signal next following said time of examination, said fifth logic means further including means for determining the truth of a condition in which:

said maximum count signal is present or said first input thereto indicates the presence of a signal at a time of two clock signals after said reference clock signal or said second input thereto indicates the presence of a signal at a time of two clock signals after said reference clock signal, and means for generating said output from said fifth logic means if said condition thereof is true and said state machine output is an enabling output.

12. The improvement of claim 11 wherein:

said first flip-flop of said state machine generates an output $Q_1$, said second flip-flop of said state machine generates an output $Q_2$, said state machine being capable of setting each of said outputs $Q_1$ and $Q_2$ to a high logic level or a low logic level, said state machine having four states S0–S3 defined by the logic levels of said outputs $Q_1$ and $Q_2$ as follows:

| State | $Q_1$ | $Q_2$ |
|-------|-------|-------|
| S0 | Low | Low |
| S1 | High | Low |
| S2 | Low | High |
| S3 | High | High | said maximum count to said state machine, and said first and second inputs thereto, when considered as a three digit binary number with said maximum count input as the most significant digit and said first input thereto as the least significant digit, having an octal number equivalent of value from zero to seven, said state machine being controlled by said internal logic thereof, when in said S0 state at the time of any said clock signal, to transition to said S1 upon the next following clock signal only if said octal equivalent of said inputs thereto has a value of one or seven and, when in said S1 state at the time of any said clock signal, to transition to said S3 state only if said octal equivalent has a value of one and to transition to said S0 state if said octal equivalent has a value of two, four or six, and, when in said S3 state at the time of any said clock signal, to transition to said S1 state only if said octal equivalent has a value of zero or four, said $Q_1$ output, after any of said transitions, comprising said enabling output of said state machine if said $Q_1$ output is then at a high logic level.

13. The improvement of claim 12 wherein said maximum count of said insertion counter is sixteen clock signals and with additionally:

sixth logic means for examining the contents of said first second and third registers to determine the truth of a condition in which:

a signal is present in said first register at a time corresponding to fourteen clock signals prior to said reference clock signal and no signal is present at a time extending from just before thirteen clock signals prior to said reference clock signal until just after two clock signals after said reference clock signal, no signal is present in said second register during an interval extending from just before the thirteenth clock signal prior to said reference clock signal until just after the second clock signal after said reference clock signal, and a signal is present in said third register during an interval extending from just before the thirteenth clock signal before said reference clock signal until just after the fifth clock signal before said reference clock signal; and means providing a preload signal to said insertion counter to cause said counter to load a count equal to nine when said output signal of said fifth logic means appears if said condition of said sixth means is true.

14. The improvement of claim 12, further including:
seventh logic means for examining the contents of said first, second and third registers to determine the truth of a condition in which:

a signal is present in said third register during the entirety of an interval extending through a time corresponding to just before the third clock signal before said reference clock signal until just after the first clock signal before said reference clock signal, and no signal is present in said second register during the entirety of an interval extending from just before the second clock signal before said reference clock signal until just after the first clock signal after said reference clock signal and a signal is present in said third register and no signal is present in said third register at a time just before the first clock signal after said reference clock signal, or a signal is present in said first register at a time just before the second clock signal after said reference clock signal and no signal is present in said third register at the time of said first clock signal after said reference clock signal and a signal is present in said third register at a time just before the second clock signal after said reference clock signal, or a signal is present in both said first and said second registers at a time just before the first clock signal after said reference clock signal; and means for inserting a signal in said second register at a time corresponding to the third clock signal after said reference clock signal.

15. The improvement of claim 14, further including:
eighth logic means for examining the contents of said first, second and third registers to determine the truth of a condition in which:

a signal is present in said first register at a time corresponding to the ninth clock signal before said reference clock signal and no signal is present therein from a time from just before the eighth clock signal before said reference clock signal until just after the first clock signal after said reference clock signal, and no signal is present in said second register during an interval extending from just before the eighth clock signal before said reference clock signal until just after the second clock signal after the second clock signal after said reference clock signal, and a signal is present in said third register during the entirety of an interval extending from just before the eighth clock signal before said reference clock signal until just after the first clock signal after said reference clock signal; and means for inserting a signal in said first register at a time corresponding to the second clock signal before said reference clock signal if said condition of said eighth logic means is true.

16. The improvement of claim 14, further including:
eighth logic means for examining the contents of said first, second and third registers to determine the truth of a condition in which:

a signal is present in said first register at a time corresponding to the tenth clock signal before said reference clock signal and no signal is present therein from a time from just before the ninth clock signal before said reference clock signal until just after the first clock signal after said reference clock signal, and no signal is present in said second register during an interval extending from just before the ninth clock signal before said reference clock signal until just after the second clock signal after the second clock signal after said reference clock signal, and a signal is present in said third register during the entirety of an interval extending from just before the ninth clock signal before said reference clock signal until just after said reference clock signal; and means for inserting a signal in said first register at a time corresponding to the third clock signal before said reference clock signal if said condition of said eighth logic means is true.

17. The improvement of claim 14, further including:

eighth logic means for examining the contents of said first, second and third registers to determine the truth of a condition in which:

a signal is present in said first register at a time corresponding to the eleventh clock signal before said reference clock signal and no signal is present therein from a time from just before the tenth clock signal before said reference clock signal until just after the first clock signal after said reference clock signal; and no signal is present in said second register during an interval extending from just before the tenth clock signal before said reference clock signal until just after the second clock signal after the second clock signal after said reference clock signal, and a signal is present in said third register during the entirety of an interval extending from just before the tenth clock signal before said reference clock signal until just after the first clock signal before said reference clock signal; and means for inserting a signal in said first register at a time corresponding to the fourth clock signal before said reference clock signal if said condition of said eighth logic means is true.

18. The improvement of claim 14, further including:

eighth logic means for examining the contents of said first, second and third registers to determine the truth of a condition in which:

a signal is present in said first register at a time corresponding to the twelfth clock signal before said reference clock signal and no signal is present therein from a time rom just before the eleventh clock signal before said reference clock signal until just after the first clock signal after said reference clock signal, and no signal is present in said second register during an interval extending from just before the eleventh clock signal before said reference clock signal until just after the second clock signal after the second clock signal after said reference clock signal, and a signal is present in said third register during the entirety of an interval extending from just before the eleventh clock signal before said reference clock signal until just after the second clock signal before said reference clock signal; and means for inserting a signal in said first register at a time corresponding to the fifth clock signal before said reference clock signal if said condition of said eighth logic means is true.

19. The improvement of claim 14, further including:

eighth logic means for examining the contents of said first, second and third registers to determine the truth of a condition in which:

a signal is present in said first register at a time corresponding to the thirteenth clock signal before said reference clock signal and no signal is present therein from a time from just before the twelfth clock signal before said reference clock signal until just after the first clock signal after said reference clock signal, and no signal is present in said second register during an interval extending from just before the twelfth clock signal before said reference clock signal until just after the second clock signal after said reference clock signal, and a signal is present in said third register during the entirety of an interval extending from just before the twelfth clock signal before said reference clock signal until just after the third clock signal before said reference clock signal; and means for inserting a signal in said first register at a time corresponding to the sixth clock signal before said reference clock signal if said condition of said eighth logic means is true.

20. The improvement of claim 14, further including:

eighth logic means for examining the contents of said first, second and third registers to determine the truth of a condition in which:

a signal is present in said first register at a time corresponding to the fourteenth clock signal before said reference clock signal and no signal is present therein from a time from just before the twelfth clock signal before said reference clock signal until just after the first clock signal after said reference clock signal, and no signal is present in said second register during an interval extending from just before the thirteenth clock signal before said reference clock signal until just after the second clock signal after said reference clock signal, and a signal is present in said third register during the entirety of an interval extending from just before the thirteenth clock signal before said reference clock signal until just after the fourth clock signal before said reference clock signal; and means for inserting a signal in said first register at a time corresponding to the seventh clock signal before said reference clock signal if said condition of said eighth logic means is true.

* * * * *